United States Patent
Tsvelykh et al.

(10) Patent No.: US 11,774,592 B2
(45) Date of Patent: Oct. 3, 2023

(54) MULTIMODE COMMUNICATION AND RADAR SYSTEM RESOURCE ALLOCATION

(71) Applicant: Infineon Technologies AG, Neubiberg (DE)

(72) Inventors: Ivan Tsvelykh, Munich (DE); Ashutosh Baheti, Munich (DE); Avik Santra, Munich (DE); Samo Vehovc, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 958 days.

(21) Appl. No.: 16/574,551

(22) Filed: Sep. 18, 2019

(65) Prior Publication Data
US 2021/0080580 A1   Mar. 18, 2021

(51) Int. Cl.
*G01S 17/58*  (2006.01)
*G01S 17/48*  (2006.01)
(Continued)

(52) U.S. Cl.
CPC ............ *G01S 17/58* (2013.01); *G01S 13/345* (2013.01); *G01S 17/48* (2013.01); *G06F 3/0325* (2013.01);
(Continued)

(58) Field of Classification Search
CPC ........ G01S 17/58; G01S 13/345; G01S 17/48; G01S 7/356; G01S 7/032; G01S 7/35;
(Continued)

(56) References Cited

U.S. PATENT DOCUMENTS

| 4,241,347 A | 12/1980 | Albanese et al. |
| 5,724,042 A * | 3/1998 | Komatsu ............... H01Q 21/08 342/175 |

(Continued)

FOREIGN PATENT DOCUMENTS

| CN | 1463161 A | 12/2003 |
| CN | 1716695 A | 1/2006 |

(Continued)

OTHER PUBLICATIONS

G. N. Saddik, R. S. Singh and E. R. Brown, "Ultra-Wideband Multifunctional Communications/Radar System," in IEEE Transactions on Microwave Theory and Techniques, vol. 55, No. 7, pp. 1431-1437, Jul. 2007, doi: 10.1109/TMTT.2007.900343. (Year: 2007).*

(Continued)

*Primary Examiner* — Timothy A Brainard
*Assistant Examiner* — Ismaaeel A. Siddiquee
(74) *Attorney, Agent, or Firm* — Slater Matsil, LLP

(57) ABSTRACT

A wireless multimode system includes: an array of N antenna elements that includes a first portion of M antenna elements and a second portion of L antenna elements; M transmission amplifiers configured to transmit, via the M antenna elements, frames of transmit data, where the frames of transmit data include transmit radar signals and transmit communication signals; M reception amplifiers configured to receive, via the M antenna elements, frames of receive data, where the frames of receive data includes receive communication signals; and L reception amplifiers configured to receive, via the L antenna elements, receive radar signals; and a resource scheduler configured to allocate bandwidth for transmit radar signals and transmit communication signals within the frames of transmit data based on one or more predetermined parameters.

20 Claims, 9 Drawing Sheets

(51) Int. Cl.
*G01S 13/34* (2006.01)
*G06F 3/03* (2006.01)
*G06F 17/14* (2006.01)
G01S 7/35 (2006.01)
G01S 13/02 (2006.01)
G01S 7/03 (2006.01)
G01S 7/41 (2006.01)
H04W 72/542 (2023.01)
G01S 7/285 (2006.01)
H04L 27/26 (2006.01)
H04W 72/0453 (2023.01)
H04B 7/06 (2006.01)
G01S 7/00 (2006.01)
G01S 13/06 (2006.01)

(52) U.S. Cl.
CPC ............ *G06F 17/142* (2013.01); *G01S 7/006* (2013.01); *G01S 7/032* (2013.01); *G01S 7/285* (2013.01); *G01S 7/35* (2013.01); *G01S 7/356* (2021.05); *G01S 7/41* (2013.01); *G01S 7/418* (2013.01); *G01S 13/02* (2013.01); *G01S 13/06* (2013.01); *H04B 7/0617* (2013.01); *H04L 27/2601* (2013.01); *H04W 72/0453* (2013.01); *H04W 72/542* (2023.01)

(58) Field of Classification Search
CPC .......... G01S 7/006; G01S 7/285; G01S 7/352; G01S 7/41; G01S 7/418; G01S 13/02; G01S 13/06; G01S 2013/0245; G06F 3/0325; G06F 17/142; H04W 72/0453; H04W 72/085; H04B 7/0617; H04L 27/2601
See application file for complete search history.

(56) References Cited

U.S. PATENT DOCUMENTS

| | | | |
|---|---|---|---|
| 6,147,572 A | 11/2000 | Kaminski et al. | |
| 6,414,631 B1 | 7/2002 | Fujimoto | |
| 6,636,174 B2 | 10/2003 | Arikan et al. | |
| 6,784,837 B2* | 8/2004 | Revankar ............ | H01Q 21/0025 342/372 |
| 6,867,727 B1 | 3/2005 | Mitra | |
| 7,048,973 B2 | 5/2006 | Sakamoto et al. | |
| 7,057,564 B2 | 6/2006 | Tsai et al. | |
| 7,171,052 B2 | 1/2007 | Park | |
| 7,317,417 B2 | 1/2008 | Arikan et al. | |
| 7,596,241 B2 | 9/2009 | Rittscher et al. | |
| 7,692,574 B2 | 4/2010 | Nakagawa | |
| 7,873,326 B2 | 1/2011 | Sadr | |
| 7,889,147 B2 | 2/2011 | Tam et al. | |
| 7,994,969 B2 | 8/2011 | Van Caekenberghe et al. | |
| 8,228,382 B2 | 7/2012 | Pattikonda | |
| 8,497,805 B2 | 7/2013 | Rofougaran et al. | |
| 8,659,369 B2 | 2/2014 | Rofougaran et al. | |
| 8,731,502 B2 | 5/2014 | Salle et al. | |
| 8,836,596 B2 | 9/2014 | Richards et al. | |
| 8,847,814 B2 | 9/2014 | Himmelstoss et al. | |
| 8,860,532 B2 | 10/2014 | Gong et al. | |
| 8,976,061 B2 | 3/2015 | Chowdhury | |
| 9,172,132 B2 | 10/2015 | Kam et al. | |
| 9,182,476 B2 | 11/2015 | Wintermantel | |
| 9,202,105 B1 | 12/2015 | Wang et al. | |
| 9,413,079 B2 | 8/2016 | Kamgaing et al. | |
| 9,495,600 B2 | 11/2016 | Heu et al. | |
| 9,886,095 B2 | 2/2018 | Pothier | |
| 9,935,065 B1 | 4/2018 | Baheti et al. | |
| 2003/0179127 A1 | 9/2003 | Wienand | |
| 2004/0141559 A1* | 7/2004 | Tewfik ............... | H04B 1/71635 375/248 |
| 2004/0238857 A1 | 12/2004 | Beroz et al. | |
| 2006/0001572 A1 | 1/2006 | Gaucher et al. | |

| | | | |
|---|---|---|---|
| 2006/0018279 A1* | 1/2006 | Agrawal ................... | H04L 5/14 370/330 |
| 2006/0049995 A1 | 3/2006 | Imaoka et al. | |
| 2006/0067456 A1 | 3/2006 | Ku et al. | |
| 2007/0210959 A1 | 9/2007 | Herd et al. | |
| 2008/0106460 A1 | 5/2008 | Kurtz et al. | |
| 2008/0238759 A1 | 10/2008 | Carocari et al. | |
| 2008/0291115 A1 | 11/2008 | Doan et al. | |
| 2008/0308917 A1 | 12/2008 | Pressel et al. | |
| 2009/0073026 A1 | 3/2009 | Nakagawa | |
| 2009/0085815 A1 | 4/2009 | Jakab et al. | |
| 2009/0153428 A1 | 6/2009 | Rofougaran et al. | |
| 2009/0212998 A1* | 8/2009 | Szajnowski ........... | G01S 13/106 342/204 |
| 2009/0315761 A1 | 12/2009 | Walter et al. | |
| 2010/0207805 A1 | 8/2010 | Haworth | |
| 2011/0299433 A1 | 12/2011 | Darabi et al. | |
| 2012/0087230 A1 | 4/2012 | Guo et al. | |
| 2012/0092284 A1 | 4/2012 | Rofougaran et al. | |
| 2012/0116231 A1 | 5/2012 | Liao et al. | |
| 2012/0195161 A1 | 8/2012 | Little et al. | |
| 2012/0206339 A1 | 8/2012 | Dahl | |
| 2012/0265486 A1 | 10/2012 | Klofer et al. | |
| 2012/0268314 A1 | 10/2012 | Kuwahara et al. | |
| 2012/0280900 A1 | 11/2012 | Wang et al. | |
| 2013/0027240 A1 | 1/2013 | Chowdhury | |
| 2013/0106673 A1 | 5/2013 | McCormack et al. | |
| 2013/0182685 A1* | 7/2013 | Yu ..................... | H04W 52/0229 370/336 |
| 2014/0028542 A1 | 1/2014 | Lovitt et al. | |
| 2014/0070994 A1 | 3/2014 | Schmalenberg et al. | |
| 2014/0145883 A1 | 5/2014 | Baks et al. | |
| 2014/0324888 A1 | 10/2014 | Xie et al. | |
| 2015/0181840 A1 | 7/2015 | Tupin, Jr. et al. | |
| 2015/0185316 A1 | 7/2015 | Rao et al. | |
| 2015/0212198 A1 | 7/2015 | Nishio et al. | |
| 2015/0243575 A1 | 8/2015 | Strothmann et al. | |
| 2015/0277569 A1 | 10/2015 | Sprenger et al. | |
| 2015/0325925 A1 | 11/2015 | Kamgaing et al. | |
| 2015/0346820 A1 | 12/2015 | Poupyrev et al. | |
| 2015/0348821 A1 | 12/2015 | Iwanaga et al. | |
| 2015/0364816 A1 | 12/2015 | Murugan et al. | |
| 2015/0378004 A1 | 12/2015 | Wilson-Langman et al. | |
| 2016/0018511 A1 | 1/2016 | Nayyar et al. | |
| 2016/0041617 A1 | 2/2016 | Poupyrev | |
| 2016/0041618 A1 | 2/2016 | Poupyrev | |
| 2016/0061942 A1 | 3/2016 | Rao et al. | |
| 2016/0061947 A1 | 3/2016 | Patole et al. | |
| 2016/0098089 A1 | 4/2016 | Poupyrev | |
| 2016/0103213 A1 | 4/2016 | Ikram et al. | |
| 2016/0109566 A1 | 4/2016 | Liu et al. | |
| 2016/0118353 A1 | 4/2016 | Ahrens et al. | |
| 2016/0135655 A1 | 5/2016 | Ahn et al. | |
| 2016/0146931 A1 | 5/2016 | Rao et al. | |
| 2016/0146933 A1 | 5/2016 | Rao et al. | |
| 2016/0178730 A1 | 6/2016 | Trotta et al. | |
| 2016/0187462 A1 | 6/2016 | Altus et al. | |
| 2016/0191232 A1 | 6/2016 | Subburaj et al. | |
| 2016/0223651 A1 | 8/2016 | Kamo et al. | |
| 2016/0240907 A1 | 8/2016 | Haroun | |
| 2016/0249133 A1 | 8/2016 | Sorensen | |
| 2016/0252607 A1 | 9/2016 | Saboo et al. | |
| 2016/0259037 A1 | 9/2016 | Molchanov et al. | |
| 2016/0266233 A1 | 9/2016 | Mansour | |
| 2016/0269815 A1 | 9/2016 | Liao et al. | |
| 2016/0291130 A1 | 10/2016 | Ginsburg et al. | |
| 2016/0299215 A1 | 10/2016 | Dandu et al. | |
| 2016/0306034 A1 | 10/2016 | Trotta et al. | |
| 2016/0320852 A1 | 11/2016 | Poupyrev | |
| 2016/0320853 A1 | 11/2016 | Lien et al. | |
| 2016/0327633 A1 | 11/2016 | Kumar et al. | |
| 2016/0334502 A1 | 11/2016 | Ali et al. | |
| 2016/0349845 A1 | 12/2016 | Poupyrev et al. | |
| 2016/0365890 A1* | 12/2016 | Reynolds ............ | H04L 27/2602 |
| 2017/0033062 A1 | 2/2017 | Liu et al. | |
| 2017/0041038 A1 | 2/2017 | Kirkpatrick et al. | |
| 2017/0045607 A1 | 2/2017 | Bharadwaj et al. | |
| 2017/0052618 A1 | 2/2017 | Lee et al. | |
| 2017/0054449 A1 | 2/2017 | Mani et al. | |

(56) References Cited

U.S. PATENT DOCUMENTS

| | | |
|---|---|---|
| 2017/0060254 A1 | 3/2017 | Molchanov et al. |
| 2017/0070952 A1 | 3/2017 | Balakrishnan et al. |
| 2017/0074974 A1 | 3/2017 | Rao et al. |
| 2017/0074980 A1 | 3/2017 | Adib et al. |
| 2017/0090014 A1 | 3/2017 | Subburaj et al. |
| 2017/0090015 A1 | 3/2017 | Breen et al. |
| 2017/0115377 A1 | 4/2017 | Giannini et al. |
| 2017/0131395 A1 | 5/2017 | Reynolds et al. |
| 2017/0139036 A1 | 5/2017 | Nayyar et al. |
| 2017/0141453 A1 | 5/2017 | Waelde et al. |
| 2017/0170947 A1 | 6/2017 | Yang |
| 2017/0176574 A1 | 6/2017 | Eswaran et al. |
| 2017/0192847 A1 | 7/2017 | Rao et al. |
| 2017/0201019 A1 | 7/2017 | Trotta |
| 2017/0212597 A1 | 7/2017 | Mishra |
| 2017/0310758 A1 | 10/2017 | Davis et al. |
| 2017/0364160 A1 | 12/2017 | Malysa et al. |
| 2018/0046255 A1 | 2/2018 | Rothera et al. |
| 2018/0071473 A1 | 3/2018 | Trotta et al. |
| 2018/0101239 A1 | 4/2018 | Yin et al. |
| 2018/0199377 A1 | 7/2018 | Sanderovich et al. |
| 2018/0241822 A1 | 8/2018 | Davis et al. |
| 2018/0348339 A1 | 12/2018 | Lien et al. |
| 2019/0219688 A1* | 7/2019 | Liu .................. G01S 13/89 |
| 2020/0137757 A1* | 4/2020 | Negus .................. H01Q 21/29 |
| 2021/0136696 A1* | 5/2021 | Burke ................ H04W 52/146 |
| 2021/0270951 A1* | 9/2021 | Yoshizawa ............ H04W 72/12 |
| 2021/0314045 A1* | 10/2021 | Cha ...................... H04W 16/28 |

FOREIGN PATENT DOCUMENTS

| | | |
|---|---|---|
| CN | 101490578 A | 7/2009 |
| CN | 101585361 A | 11/2009 |
| CN | 102788969 A | 11/2012 |
| CN | 102967854 A | 3/2013 |
| CN | 103529444 A | 1/2014 |
| CN | 203950036 U | 11/2014 |
| CN | 106911605 A | 6/2017 |
| DE | 102008054570 A1 | 6/2010 |
| DE | 102011100907 A1 | 1/2012 |
| DE | 102011075725 A1 | 11/2012 |
| DE | 102014118063 A1 | 7/2015 |
| GB | 2247799 A | 3/1992 |
| JP | 2001174539 A | 6/2001 |
| JP | 2004198312 A | 7/2004 |
| JP | 2006234513 A | 9/2006 |
| JP | 2008029025 A | 2/2008 |
| JP | 2008089614 A | 4/2008 |
| JP | 2009069124 A | 4/2009 |
| JP | 2011529181 A | 12/2011 |
| JP | 2012112861 A | 6/2012 |
| JP | 2013521508 A | 6/2013 |
| JP | 2014055957 A | 3/2014 |
| KR | 20090063166 A | 6/2009 |
| KR | 20140082815 A | 7/2014 |
| WO | 2007060069 A1 | 5/2007 |
| WO | 2013009473 A2 | 1/2013 |
| WO | 2016033361 A1 | 3/2016 |

OTHER PUBLICATIONS

Saddik, George N., et al., "Ultra-Wideband Multifunctional Communications/Radar System", IEEE Transactions on Microwave Theory and Techniques, vol. 55, No. 7, Jul. 2007, 7 pages.

"BT24MTR11 Using BGT24MTR11 in Low Power Applications 24 GHz Rader," Application Note AN341, Revision: Rev 1.0, Infineon Technologies AG, Munich, Germany, Dec. 2, 2013, 25 pages.

Chen, Xiaolong et al., "Detection and Extraction of Marine Target with Micromotion via Short-Time Fractional Fourier Transform in Sparse Domain," IEEE International Conference on Signal Processing, Communications and Computing, ICSPCC, Aug. 5-8, 2016, 5 pages.

Chen, Xiaolong et al., "Detection and Extraction of Target with Micromotion in Spiky Sea Clutter via Short-Time Fractional Fourier Transform", IEEE Transactions on Geoscience and Remote Sensing, vol. 52, No. 2, Feb. 2014, pp. 1002-1018.

Chuanhua, Du, "FMCW Radar Range-Doppler Processing and Beam Formation Technology," Chinese Doctoral Dissertations & Master's Theses Full Text Database (Masters)—Information Science and Technology Series, China National Knowledge Infrastructure, ISSN 1674-0246, CN 11-9144/G, Dec. 16, 2004-Mar. 2015, 14 pages.

Deacon, Peter et al., "Frequency Modulated Continuous Wave (FMCW) Radar," Design Team 6 Technical Lecture, Nov. 9, 2011, 27 pages.

Dham, Vivek "Programming Chirp Parameters in TI Radar Devices," Application Report SWRA553, Texas Instruments, May 2017, 15 pages.

Diederichs, Kailtyn et al., "Wireless Biometric Individual Identification Utilizing Millimeter Waves", IEEE Sensors Letters, vol. 1, No. 1, IEEE Sensors Council 3500104, Feb. 2017, 4 pages.

Dooring Alert Systems, "Riders Matter," http:\\dooringalertsystems.com, printed Oct. 4, 2017, 16 pages.

Filippelli, Mario et al., "Respiratory dynamics during laughter," J Appl Physiol, (90), 1441-1446, Apr. 2001, http://jap.physiology.org/content/jap/90/4/1441.full.pdf.

Fox, Ben, "The Simple Technique That Could Save Cyclists' Lives," https://www.outsideonline.com/2115116/simple-technique-could-save-cyclists-lives, Sep. 19, 2016, 6 pages.

Gu, Changzhan et al., "Assessment of Human Respiration Patterns via Noncontact Sensing Using Doppler Multi-Radar System", Sensors Mar. 2015, 15(3), 6383-6398, doi: 10.3390/s150306383, 17 pages.

Guercan, Yalin "Super-resolution Algorithms for Joint Range-Azimuth-Doppler Estimation in Automotive Radars," Technische Universitet Delft, TUDelft University of Technology Challenge the Future, Jan. 25, 2017, 72 pages.

Sun, G. et al., "Signal Processing Techniques in Network-Aided Positioning", IEEE Signal Processing Magazine, Jul. 2005, 12 pages.

Inac, Ozgur et al., "A Phased Array RFIC with Built-In Self-Test Capabilities," IEEE Transactions on Microwave Theory and Techniques, vol. 60, No. 1, Jan. 2012, 10 pages.

Keysight Technologies, First Steps in 5G, "Overcoming New Radio Device Design Challenges Series", Nov. 2017, 7 pages.

Killedar, Abdulraheem "XWR1xxx Power Management Optimizations—Low Cost LC Filter Solution," Application Report SWRA577, Texas Instruments, Oct. 2017, 19 pages.

Kizhakkel, V., "Pulsed Radar Target Recognition Based on Micro-Doppler Signatures Using Wavelet Analysis", A Thesis, Graduate Program in Electrical and Computer Engineering, Ohio State University, Jan. 2013-May 2013, 118 pages.

Kuehnke, Lutz, "Phased Array Calibration Procedures Based on Measured Element Patterns," 2001 Eleventh International Conference on Antennas and Propagation, IEEE Conf., Publ. No. 480, Apr. 17-20, 2001, 4 pages.

Lim, Soo-Chul et al., "Expansion of Smartwatch Touch Interface from Touchscreen to Around Device Interface Using Infrared Line Image Sensors," Sensors 2015, ISSN 1424-8220, vol. 15, 16642-16653, doi:10.3390/s150716642, www.mdpi.com/journal/sensors, Jul. 15, 2009, 12 pages.

Lin, Jau-Jr et al., "Design of an FMCW radar baseband signal processing system for automotive application," SpringerPlus a SpringerOpen Journal, (2016) 5:42, http://creativecommons.org/licenses/by/4.0/, DOI 10.1186/s40064-015-1583-5; Jan. 2016, 16 pages.

Microwave Journal Frequency Matters, "Single-Chip 24 GHz Radar Front End," Infineon Technologies AG, www.microwavejournal.com/articles/print/21553-single-chip-24-ghz-radar-front-end, Feb. 13, 2014, 2 pages.

Qadir, Shahida G., et al., "Focused ISAR Imaging of Rotating Target in Far-Field Compact Range Anechoic Chamber," 14th International Conference on Aerospace Sciences & Aviation Technology, ASAT-14-241-IP, May 24-26, 2011, 7 pages.

(56) References Cited

OTHER PUBLICATIONS

Richards, Mark A., "Fundamentals of Radar Signal Processing," McGraw Hill Electronic Engineering, ISBN: 0-07-144474-2, Jun. 2005, 93 pages.

Schroff, Florian et al., "FaceNet: A Unified Embedding for Face Recognition and Clustering," CVF, CVPR2015, IEEE Computer Society Conference on Computer Vision and Pattern Recognition; Mar. 12, 2015, pp. 815-823.

Simon, W., et al., "Highly Integrated KA-Band Tx Frontend Module Including 8×8 Antenna Array," IMST GmbH, Germany, Asia Pacific Microwave Conference, Dec. 7-10, 2009, 63 pages.

Suleymanov, Suleyman, "Design and Implementation of an FMCW Radar Signal Processing Module for Automotive Applications," Master Thesis, University of Twente, Aug. 31, 2016, 61 pages.

Thayaparan, T. et al., "Micro-Doppler Radar Signatures for Intelligent Target Recognition," Defence Research and Development Canada, Technical Memorandum, DRDC Ottawa TM 2004-170, Sep. 2004, 73 pages.

Thayaparan, T. et al., "Intelligent target recognition using micro-Doppler radar signatures," Defence R&D Canada, Radar Sensor Technology III, Proc. of SPIE, vol. 7308, 730817, Dec. 9, 2009, 11 pages.

Wilder, Carol N., et al., "Respiratory patterns in infant cry," Canada Journal of Speech, Human Communication Winter, 1974-75, http://cjslpa.ca/files/1974_HumComm_Vol_01/No_03_2-60/Wilder_Baken_HumComm_1974.pdf, pp. 18-34.

Sakpere, W. et al., "A state-of-the-art survey of indoor positioning and navigation systems and technologies", SAC/29(3) Dec. 2017, 53 pages.

Xin, Qin et al., "Signal Processing for Digital Beamforming FMCW SAR," Hindawi Publishing Corporation, Mathematical Problems in Engineering, vol. 2014, Article ID 859890, http://dx.doi.org/10.1155/2014/859890, Apr. 15, 2014, 11 pages.

\* cited by examiner

MULTIMODE COMMUNICATION AND RADAR SYSTEM RESOURCE ALLOCATION

TECHNICAL FIELD

The present disclosure relates generally to an electronic system and method, and, in particular embodiments, to a multimode communication and radar system resource allocation.

BACKGROUND

Applications in the millimeter-wave (mmWave) frequency regime have gained significant interest in the past few years due to the rapid advancement in low cost semiconductor technologies, such as silicon germanium (SiGe) and fine geometry complementary metal-oxide semiconductor (CMOS) processes. Availability of high-speed bipolar and metal-oxide semiconductor (MOS) transistors has led to a growing demand for integrated circuits for millimeter-wave applications at 24 GHz, 60 GHz, 77 GHz, and 80 GHz and also beyond 100 GHz. Such applications include, for example, automotive radar systems and multi-gigabit communication systems.

In some radar systems, the distance between the radar and a target is determined by transmitting a frequency modulated signal, receiving a reflection of the frequency modulated signal (also referred to as the echo), and determining a distance based on a time delay and/or frequency difference between the transmission and reception of the frequency modulated signal. Accordingly, some radar systems include a transmit antenna to transmit the radio-frequency (RF) signal, and a receive antenna to receive the reflected RF signal, as well as the associated RF circuitry used to generate the transmitted signal and to receive the RF signal. In some cases, multiple antennas may be used to implement directional beams using phased array techniques. A multiple-input and multiple-output (MIMO) configuration with multiple chipsets can be used to perform coherent and non-coherent signal processing as well.

SUMMARY

In accordance with an embodiment, a wireless multimode system includes: an array of N antenna elements, the array including a first portion of M antenna elements and a second portion of L antenna elements, the second portion being different than the first portion, where N, M and L are positive integers greater than zero, and where M plus L is lower than or equal to N; M transmission amplifiers coupled to respective antenna elements of the first portion of M antenna elements, the M transmission amplifiers configured to transmit, via the M antenna elements, frames of transmit data, where the frames of transmit data includes transmit radar signals and transmit communication signals; M reception amplifiers coupled to respective antenna elements of the first portion of M antenna elements, the M reception amplifiers configured to receive, via the M antenna elements, frames of receive data, where the frames of receive data includes receive communication signals, where the transmit communication signals and the receive communication signals form a communication link; and L reception amplifiers coupled to respective antenna elements of the second portion of L antenna elements, the L reception amplifiers configured to receive, via the L antenna elements, receive radar signals, where the receive radar signals corresponds to the transmit radar signals; and a resource scheduler configured to allocate bandwidth for transmit radar signals and transmit communication signals within the frames of transmit data based on one or more predetermined parameters.

In accordance with an embodiment, a millimeter-wave system includes: an array of N antenna elements, where N is a positive integer greater than zero; N transmission amplifiers; N reception amplifiers; N circulator circuits coupled between respective antenna elements of the array of N antenna elements, respective transmission amplifiers of the N transmission amplifiers, and respective reception amplifiers of the N reception amplifiers, where each of the N circulator circuit is configured to, sequentially, allow signals to flow from the respective transmission amplifier to the respective antenna element while preventing signals from flowing from the respective transmission amplifier to the respective reception amplifier, and allow signals from flowing from the respective antenna element to the respective reception amplifier while preventing signals from flowing from the respective antenna element to the respective transmission amplifier; and a controller configured to partition the array into a first portion of M antenna elements and a second portion of L antenna elements, the second portion being different than the first portion, where M and L are positive integers greater than zero, and where M plus L is lower than or equal to N, where: M transmission amplifiers of the first portion are configured to transmit, via M respective antenna elements, frames of transmit data, where the frames of transmit data includes transmit radar signals and transmit communication signals, M reception amplifiers of the first portion are configured to configured to receive, via the M respective antenna elements, frames of receive data, where the frames of receive data includes receive communication signals, where the transmit communication signals and the receive communication signals form a communication link, and L reception amplifiers of the second portion configured to receive, via the L respective antenna elements, receive radar signals, where the receive radar signals corresponds to the transmit radar signals, where the resource scheduler is configured to allocate bandwidth for transmit radar signals and transmit communication signals within the frames of transmit data based on a state of the communication link.

In accordance with an embodiment, a method for operating a wireless multimode system includes: receiving data to be transmitted, the data including user communication data and radar waveforms; receiving information of a communication link associated with a first portion of an antenna array of the wireless multimode system; allocating bandwidth of frames to be transmitted by the first portion of the antenna array between the user communication data and the radar waveforms based on the received information of the communication link; transmitting the frames via the first portion of the antenna array; receiving reflected frames via a second portion of the antenna array, the second portion being different than the first portion, the reflected frames corresponding to the transmitted frames; retrieving reflected radar waveforms from the received reflected frames; and determining a location of a target based on the retrieved reflected radar waveforms.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION OF ILLUSTRATIVE EMBODIMENTS

Figure 1:
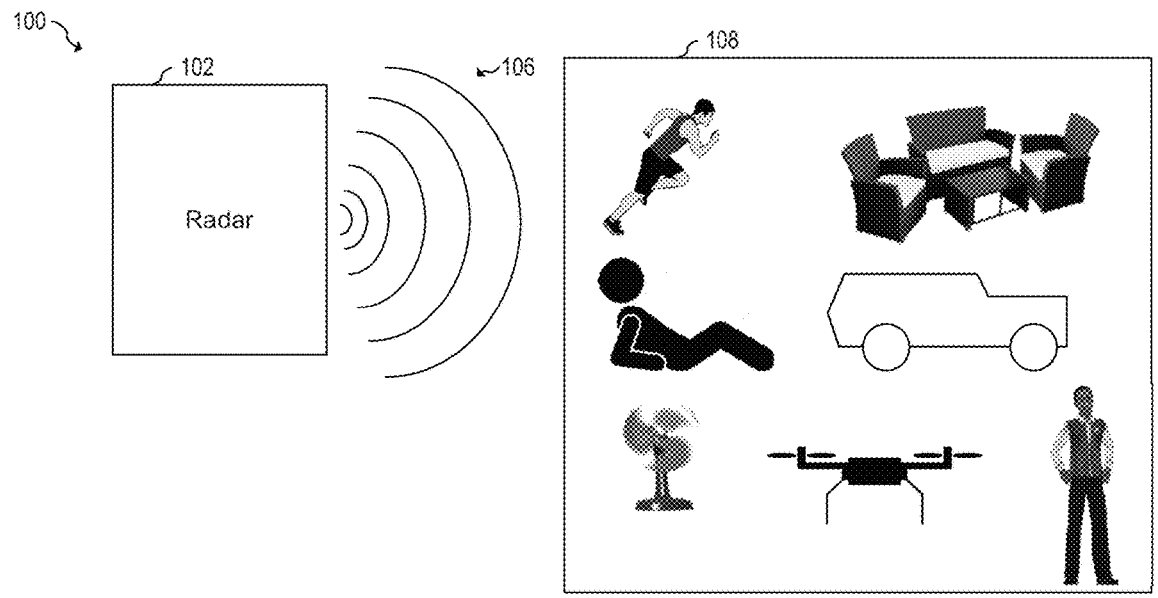
FIG. 1 shows a wireless multimode system operating as a radar, according to an embodiment of the present invention.

The making and using of the embodiments disclosed are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The description below illustrates the various specific details to provide an in-depth understanding of several example embodiments according to the description. The embodiments may be obtained without one or more of the specific details, or with other methods, components, materials and the like. In other cases, known structures, materials or operations are not shown or described in detail so as not to obscure the different aspects of the embodiments. References to "an embodiment" in this description indicate that a particular configuration, structure or feature described in relation to the embodiment is included in at least one embodiment. Consequently, phrases such as "in one embodiment" that may appear at different points of the present description do not necessarily refer exactly to the same embodiment. Furthermore, specific formations, structures or features may be combined in any appropriate manner in one or more embodiments.

Embodiments of the present invention will be described in a specific context, a wireless multimode system that operates as a radar and as a communication system. Embodiments of the present invention may operate in frequency ranges such as in the millimeter-wave band (30 GHz to 300 GHz), or in the centimeter-wave band (3 GHz to 30 GHz). Other frequencies, such as frequencies higher than 300 GHz or lower than 3 GHz may also be used. Embodiments of the present invention may be implemented with 5G communication systems or LTE communication systems. Implementations with other communication systems, including any orthogonal frequency-division multiplexing access (OFDMA) communication systems, WiFi, and WiGiG (also known as 60 GHz WiFi) are also possible.

In an embodiment of the present invention, a multimode communication and radar system is implemented with a millimeter-wave multimode system. The millimeter-wave multimode system transmits frames using a first portion of an antenna array. The frames include communication user data and radar waveforms. A second portion of the antenna array is used to receive reflected frames corresponding to the transmitted frames. The reflected radar waveforms are extracted from the received reflected frames and processed to detect and/or determine information of a target, such as, e.g., the location of the target. The location of the target may be used to optimize communication performance of the millimeter-wave multimode system. A resource scheduler allocates bandwidth of the frames between communication user data and radar waveforms based on a status of the communication link associated with the first portion of the antenna array.

FIG. 1 shows wireless multimode system 100 operating as a radar, according to an embodiment of the present invention. Wireless multimode system 100 includes radar 102, which may be implemented, e.g., with a millimeter-wave radar, for, e.g., transmitting radar signals, and a communication system (not shown in FIG. 1).

For operation of wireless multimode system 100 in radar mode, wireless multimode system 100 transmits radar signals 106, towards scene 108 using, e.g., a beam. The radar signals may include radar waveforms modulated using phase-shift keying (PSK), quadrature amplitude modulation (QAM), amplitude PSK (APSK), amplitude-shift keying (ASK), and frequency-shift keying (FSK). Other radar waveforms, such as radar waveforms based on pseudorandom binary sequence (PRBS), multiple frequency continuous wave (MFCW), and COSTAS code, may also be used. In some embodiments, the radar waveforms include chirps, such as linear chirps. In some embodiments, wireless multimode system 100 sends frames of equally spaced linear chirps, such as 256 equally spaced linear chirps. A different number of linear chirps, e.g., 16, 32, may also be used.

The transmitted radar signals 106 are reflected by objects in scene 108. The reflected radar signals (not shown in FIG. 1), which are also referred to as the echo signal, are detected and processed by, e.g., radar 102 (or, e.g., associated processor), to determine the angle of arrival of the echo signal, location (i.e., range, azimuth and elevation components) of moving and/or static objects in the field-of-view (FoV) of the beam, velocity and/or direction of movement of objects in the FoV of the beam, identification of the type of objects detected (e.g., using micro-Doppler and/or macro-Doppler signatures), etc. To perform these and other radar functions, radar 102 may perform one or more of Fast Fourier Transform (FFT) in slow time and/or in fast time, short-time Fast Fourier Transform (STFFT), Fractional Fourier Transform (FrFT), short-time fractional Fourier Transform (STFrFT), time-of-flight (ToF) calculations, and other radar processing techniques known in the art.

The objects in scene 108 may include static humans, such as a lying human, humans exhibiting low and infrequent motions, such as standing human, moving humans, such as a running or walking human, static or moving animals, such as dogs or cats, static or moving equipment, such as cars, trucks, drones, motorcycles, industrial equipment, furniture, periodically moving equipment, such as rotating fans, etc. Other objects may also be present in scene 108.

Radar 102 may operate as a FMCW radar that includes one or more transmitting antenna(s), and one or more receiving antenna(s). In some embodiments, the same antenna may be used for transmitting and receiving radar signals.

Radar 102 may be implemented as a millimeter-wave radar that transmits and receives signals in the 20 GHz to 122 GHz range. Alternatively, frequencies outside of this range, such as frequencies between 1 GHz and 20 GHz, or frequencies between 122 GHz, and 300 GHz, may also be used.

Figure 2:
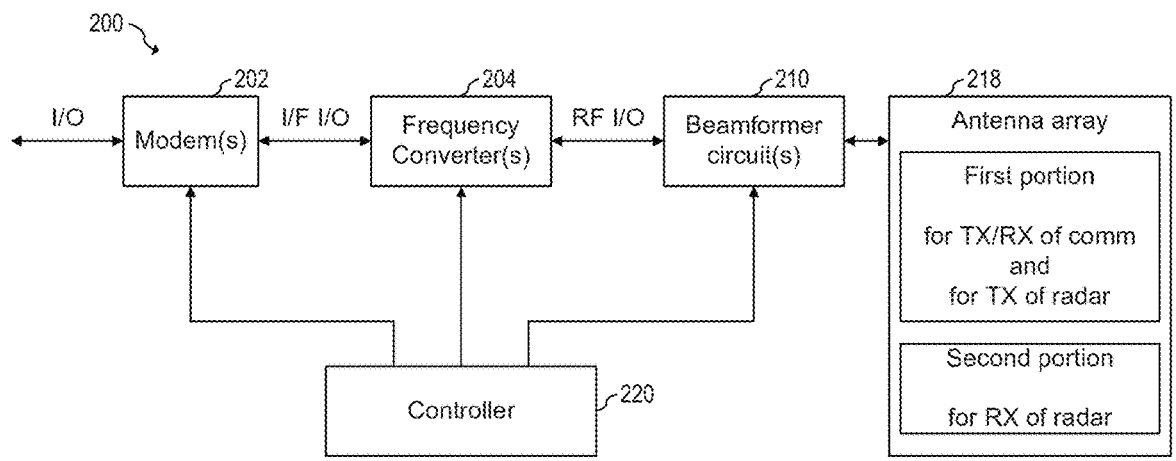
FIG. 2 shows a schematic diagram of a wireless multimode system, according to an embodiment of the present invention.

Wireless multimode system 100 is implemented with hardware that also performs communication functions. For example, FIG. 2 shows a schematic diagram of wireless multimode system 200, according to an embodiment of the present invention. Wireless multimode system 200 includes one or more modulator/demodulators (modems) 202, one or more frequency converters 204, one or more beamformer circuits 210, and an antenna array 218. Antenna array 218 includes a first portion and a second portion of antennas. As shown in FIG. 2, modems 202, frequency converters 204, and beamformer circuits 210 are bidirectional circuits (e.g., I/O stands for input/output).

Wireless multimode system 200 is capable of performing radar operations (e.g., as described with respect to radar 102) as well as communication operations. Wireless multimode system 200 operates as a communication system, such as an OFDM communication system for transmitting and/or receiving information by transmitting and receiving signals via the first portion of antenna array 218. Wireless multimode system 200 operates as a radar system (such as a millimeter-wave radar system) by transmitting radar signals via the first portion of antenna array 218 and receiving radar signals via the second portion of antenna array 218. In some embodiments, the communication signals and radar signals are embedded in frames that are transmitted via the first portion of antenna array 218 and corresponding beamformer circuit(s) 210.

For transmitting OFDM communication signals, wireless multimode system 200 receives information to be transmitted via I/O terminals, e.g., from controller 220 or from another circuit or device. Modem(s) 202 modulate the information to be transmitted to generate intermediate frequency (IF) signals. The IF signals are up-converted to RF signals, e.g., in the millimeter-wave range, using frequency converter(s) 204. The RF signals are then fed through beamformer circuit(s) 210 and transmitted through the first portion of antenna array 218.

For transmitting radar signals, wireless multimode system 200 modulates radar waveforms (e.g., from controller 220 or another circuit or device) to operate as radar using modem(s) 202 to generate IF signals. The IF signals are up-converted to RF signals, e.g., in the millimeter-wave range, using frequency converter(s) 204. The RF signals are then fed through the first portion of antenna array 218 via corresponding beamformer circuit(s) 210.

In some embodiments, the information to be transmitted (e.g., information corresponding to OFDM communication signals and/or radar signals) that is received via I/O terminals is digital. In such embodiments, the baseband to IF conversion may be done digitally and a digital-to-analog converter (DAC) may be used to generate the IF signals. In other embodiments, the information to be transmitted that is received via I/O terminals is analog. In such embodiments, the analog baseband signals are modulated by modem 202 using a quadrature (IQ) modulator/demodulator.

The OFDM signals may include 5G communication signals, such as described in 5G standards or pre-standards, such as the 5G standard release 15 (5G NR standard), 5GTF, and 5G-SIG, and future releases, such as 5G standard release 16, scheduled for December 2019. In some embodiments, wireless multimode system 200 may also be used with other OFDM communication signals, such as signals for LTE eNB, e.g., after release 13. A person skilled in the art would recognize that the teachings disclosed herein are also applicable to wireless communication protocols other than the standards and pre-standards explicitly mentioned in this disclosure. Radar signals may include, e.g., radar waveforms as described with respect to radar 102.

During normal operation, wireless multimode system 200 may receive OFDM communication signals via the first portion of antenna array 218 and radar signals via the second portion of antenna array 218. In some embodiments, wireless multimode system 200 simultaneously receives communication signals via the first portion of antenna array 218 and radar signals via the second portion of antenna array 218.

For receiving communication signals, wireless multimode system 200 receives RF signals via the first portion antenna array 218 and corresponding beamformer circuit(s) 210. The received RF signals are down-converted to IF signals using frequency converter(s) 204. The IF signals are then demodulated using modem(s) 202 and sent, e.g., to controller 220 or to another circuit or device for further communication processing.

In some embodiments, the further communication processing includes unpacking packets (e.g., extracting information from one or more communication frames), processing control frames, determining communication link quality and strength, and other known communication processing. In some embodiments, communication processing also includes determining a location of a user-equipment (UE) using known techniques, such as by using, e.g., power strength (usually called received signal strength or RSS), time of flight (ToF), and angle of arrival (AoA). In some embodiments communication processing also includes hand-off of the communication link from beam to beam and from base stations to base stations, e.g., as the UE moves, in ways known in the art. In some embodiments, configurable wireless multimode system 100 may adjust beamformer circuit(s) 210, e.g., to modify the shape and direction of the beams, e.g., based on information received via the received packets.

For receiving radar signals, wireless multimode system 200 receives RF signals via the second portion antenna array 218 and corresponding beamformer circuit(s) 210. The received RF signals correspond to the radar signals transmitted via the first portion of antenna array 218 that are reflected by objects in the field of view (FoV) of the first portion of antenna array 218 (e.g., objects in scene 108). The received RF signals are down-converted to IF signals using frequency converter(s) 204. The IF signals are then demodulated using modem(s) 202 and sent, e.g., to controller 220 or to another circuit or device for further radar processing.

In some embodiments, the further radar processing includes performing range FFT, determining angle of arrival using, e.g., the mono-pulse algorithm, identifying static and moving objects in the field of view of the one or more beams, determining the velocity of the moving objects, detecting gestures of detected objects, tracking the identified static or moving objects, performing radar imaging, and other known radar processing.

In some embodiments, each modem 202 includes a modulator circuit for modulating baseband signals into IF signals and a demodulator circuit for demodulating IF signals into baseband signals. The modulator and demodulator circuits may be implemented in any way known in the art. The implementation may be different depending on whether the signals flowing through I/O terminals are digital or analog. In some embodiments, the modulation circuit may include a DAC, digital and/or analog filters, and a digital signal processing (DSP) engine. The demodulator may include an analog-to-digital converter (ADC), digital and/or analog filters, and a digital signal processing (DSP) engine. In some embodiments, the same DSP engine may be used for the modulator circuit and for the demodulator circuit. The DSP engine may be implemented in modem 202 or in controller 220, for example. Some embodiments may implement the DSP engine independently from controller 220 and modem 202.

Modem 202 may use any known modulation/demodulation methods and techniques to insert radar and communication signals into OFDM waveform grid. For example, each communication or radar sub-carrier in the OFDM grid may be modulated using PSK, QAM, ASK, FSK, amplitude PSK (APSK). Frequency modulated continuous waveform (FMCW) for radar signals is also possible. In some embodiments, controller 220 may dynamically change the particular modulation/demodulation scheme used. For example, the modulation scheme used for radar operations may be different than the modulation scheme used for communication operations.

In some embodiments, each frequency converter 204 includes one or more mixer circuit (not shown) and one or more variable gain amplifier (VGA) (not shown), e.g., for generating RF signals based on the input IF signals and for generating IF signals based on the input RF signals. In some embodiments, the IF signals may be, for example, in the 3 GHz to 9 GHz frequency range while the RF signals may be in the millimeter-wave range, such as between 24.25 GHz and 52.6 GHz. Other frequencies in other frequency ranges may also be used.

In some embodiments, each beamformer circuit 210 includes M beamforming channels (not shown), where each beamforming channel includes a phase-shifter circuit (not shown) and a VGA (not shown). The beamforming function may be performed, for example, by analog control of channel power levels by controlling the VGA, as well as by controlling the phase shifts of the phase-shifter circuits, e.g., via corresponding register programming through a digital interface control, e.g., such as serial peripheral interface (SPI). In some embodiments, each beamformer circuit 210 has a corresponding and independent modem 202, where the beamforming function is performed partially by analog control of the channel power level via the VGA and the phase-shifter, and partially by controlling phase shifts and levels among separate digital streams in digital domain in each modem 202. In some embodiments, the beamforming function is performed by analog control only during a first time, and by digital control only during a second time, and by a mixed analog/digital control during a third time. In some embodiments, a first beamformer is controlled with only an analog control while a second beamformer is controlled with only a digital control at the same time. Other implementations are also possible.

In some embodiments, the beam is fixed. In other words, no dynamic beamforming is performed. In such embodiments, dynamic beamforming capabilities may be omitted.

In some embodiments, controller 220 may configure the beamformer circuit(s) 210 corresponding to the first portion of antenna array 218 to direct a beam towards a target direction using, e.g., analog beamforming. The beam may be used for transmitting 5G communication signals and/or radar signals and/or for receiving OFDM communication signals. In some embodiments, the beam associated to the first portion of antenna array 218 may be pointed towards a direction that optimizes the communication quality (e.g., by maximizing signal strength), such as the direction of arrival (DoA) of the communication signal. In some embodiments, the beam associated to the first portion of antenna array 218 may be directed towards a spatial location that is to be scanned, e.g., for moving or static objects. In some embodiments, the direction of the beam for communication signals and radar signals are independent, which may be achieved by using different gain/phase programming of the channels in the beamformers, e.g., in a time-division multiplexing (TDM) manner. In some embodiments, the direction of the beam is the same for communication signals and radar signals.

In some embodiments, controller 220 may configure the beamformer circuit(s) 210 corresponding to the second portion of antenna array 218 to direct a beam towards a target direction using, e.g., analog beamforming. For example, in some embodiments, the beam may be pointed towards the direction where objects are to be monitored. In some embodiments, Controller 220 may use beamforming configuration (e.g., the state of phase-shifter circuits and VGAs) for determining radar parameters, such as angle of arrival (AoA) and ranging.

In some embodiments, controller 220 may dynamically modify the direction and/or shape of the beams to optimize operation of wireless multimode system 200.

In some embodiments, the frequencies used for OFDM communication signals are the same as the frequencies used for radar signals.

In some embodiments, the frequencies used for OFDM communication signals are different than the frequencies used for radar signals. For example, in some embodiments, the frequencies used for radar signals are in a frequency range that is adjacent to the frequency range used for 5G communication. For example, in some embodiments, the frequency used for OFDM communication signals are in the 5G communication bands n258 (from 24.25 GHz to 27.5 GHz) and the frequency used for radar operations is in an adjacent industrial, scientific and medical (ISM) band from 24 GHz to 24.25 GHz. In some embodiments, the frequency used for 5G communication are in near the upper end of the FR2 band (52.6 GHz), as outlined in 5G standard release 15, and the frequency used for radar signals is in an adjacent ISM band from 61 GHz to 61.5 GHz. Other frequency ranges may also be used, such as 5G communication frequencies in the E-band (60-90 GHz) and radar operation frequencies in the 61 GHz to 61.5 GHz range.

In some embodiments, wireless multimode system 200 includes L modems 202, L frequency converters 204, L beamformer circuits 210, where each beamformer circuit 210 includes M beamforming channels, and feeds N antennas, where L may be 1 or more, M may be 1 or more, and N may be L times M.

In some embodiments, antenna array 218 includes dozens of antennas. In some embodiments, antenna array 218 may include over 100 antennas, such as 256 antennas or more, for example. The antennas of antenna array 218 may be arranged, for example, in rows and columns in ways known in the art. For example, the antennas of antenna array 218 may be spaced apart by a first distance, where the first distance is based on the wavelength of the RF signal. In some embodiments, antenna array 218 includes a plurality of antenna sub-arrays or portions, where each antenna sub-array corresponds to a modem 202.

In some embodiments, the first distance may be equal to or smaller than 0.6 times the wavelength of the RF signals used for 5G communication. Using adjacent frequency bands for 5G communication and radar operations advantageously allows for using the same antenna array for 5G communication and radar operation without substantially reducing radar or communication performance (since the first distance between antennas of antenna array 218 may be small compared to the wavelength of the RF signal, e.g., smaller than 1 times the wavelength of the RF frequency used for either 5G communication or radar operations).

Controller 220 may configure one or more of circuits 202, 204 and 210 using wired or wireless protocols. For example, in some embodiments, controller 220 uses SPI to configure modems 202, frequency converters 204, and/or beamformer circuits 210, e.g., by writing corresponding registers. Other embodiments may use Inter-Integrated Circuit (I²C), universal asynchronous receiver-transmitter (UART) or other protocols. Other embodiments may use dedicated digital or analog signals for configuring one or more aspects of modems 202, frequency converters 204, and/or beamformer circuits 210.

Controller 220 may be implemented as a general purpose processor, controller or digital signal processor (DSP) that includes, for example, combinatorial circuits coupled to a memory. In some embodiments, the DSP may be implemented with an ARM or x86 architecture, for example. In some embodiments, controller 220 may be implemented as a custom application specific integrated circuit (ASIC). In some embodiments, controller 220 includes a plurality of processors, where each processor has one or more processing cores. In other embodiments, controller 220 includes a single processor having one or more processing cores. Other implementations are also possible. Some embodiments may implement controller 220 as a combination of hardware accelerator and software running on a DSP or general purpose micro-controller.

Wireless multimode system 200 may be implemented in a monolithic semiconductor substrate in an integrated circuit (IC). In some embodiments, wireless multimode system 200 may be implemented in a plurality of semiconductor substrates that are packaged in a single package or module of, e.g., several ICs. In other embodiments, wireless multimode system 200 may be implemented in a plurality of packages. For example, in some embodiments, frequency converter(s) 204 are integrated in a first package, beamformer circuit(s) 210 are in a second package, and antennas of antenna array 218 are external to the first and second packages. In other embodiments, frequency converter(s) 204 and beamformer circuit(s) 210 are in a first package while antennas of antenna array 218 are external to the first package. Controller 220 may be implemented in a package separate from frequency converter(s) 204, beamformer circuit(s) 210. In some embodiments, modem(s) 202 is implemented together with controller 220 in the same package. In other embodiments, modem(s) 202 are implemented separately from controller 220. Other implementations are also possible.

In some embodiments, wireless multimode system 200 may be implemented with L RFICs, where L is the number of modems 202, and where each RFIC includes a modem circuit 202, a frequency converter 204, a beamformer circuit 210 having M channels, and M antennas arranged in an array of rows and columns, and where each RFIC is packaged in a single package. In other embodiments, wireless multimode system 200 may be implemented with N RFICs, where each RFIC includes one phase-shifter (or a delay element), one VGA, and one corresponding antenna. In such embodiments, modem(s) 202 and frequency converter(s) 204 may be external to the RFICs. In some embodiments, DAC and ADC are integrated in the same monolithic semiconductor substrate as modem 202 in the same IC. In some embodiments, each RFIC includes M channels. In some embodiments, each RFIC includes more than one phase-shifter and/or more than one VGA. Other integration implementations are also possible.

Figure 3:
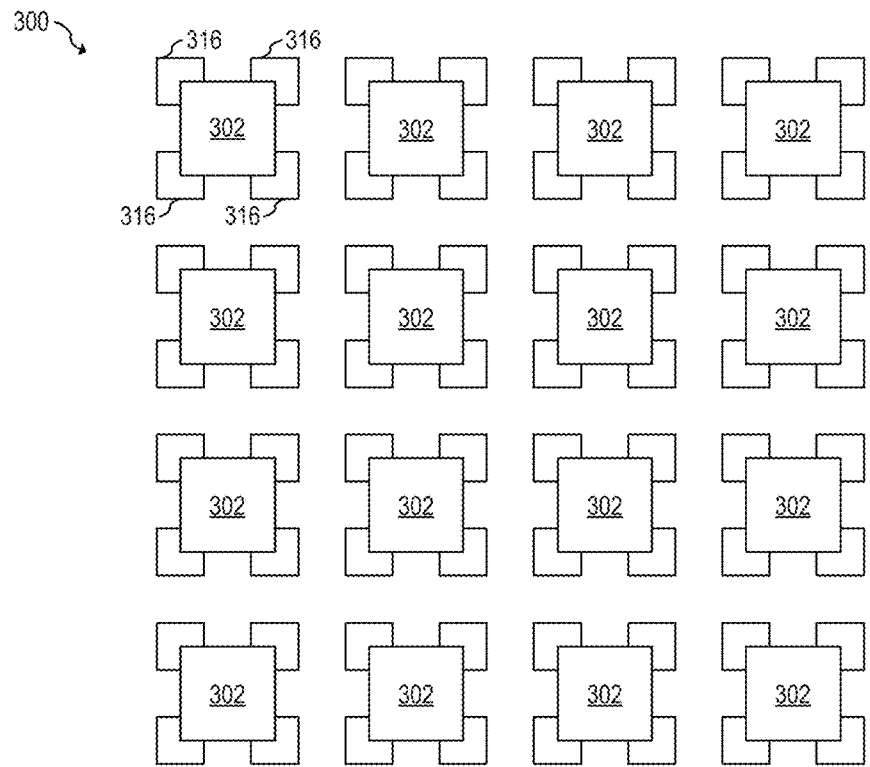
FIG. 3 shows an arrangement of RFICs of a wireless multimode system, according to an embodiment of the present invention.

FIG. 3 shows an arrangement of RFICs 302 of wireless multimode system 300, according to an embodiment of the present invention. As shown in FIG. 3, wireless multimode system 300 is arranged as a tile-based planar phased array. Other arrangements, such as slate phased array or brick phased array are also possible.

Wireless multimode system 300 is a possible implementation of wireless multimode system 200 that includes 16 RFICs 302, where each RFIC 302 includes a beamformer circuit 210 and corresponding antennas. The arrangement of RFICs 302 shown in FIG. 3 may be implemented in a printed circuit board (PCB). In some embodiments, the arrangement of RFICs 302 shown in FIG. 3 may be packaged in a module. Although wireless multimode system 300 is shown in FIG. 3 to include only 16 RFICs, a different number of RFICs, such as 4, 8, or 32 RFICs may be included in wireless multimode system 300.

As shown in FIG. 3, each RFIC 302 controls 4 antennas 316. In some embodiments, each RFIC 302 may control a different number of antennas, such as 1, 2, 8, 16, or 32, for example.

As shown in FIG. 3, each RFIC 302 is coupled to at least one antenna 316. In some embodiments, the RFIC 302 may include one or more antennas 316.

Figure 4:
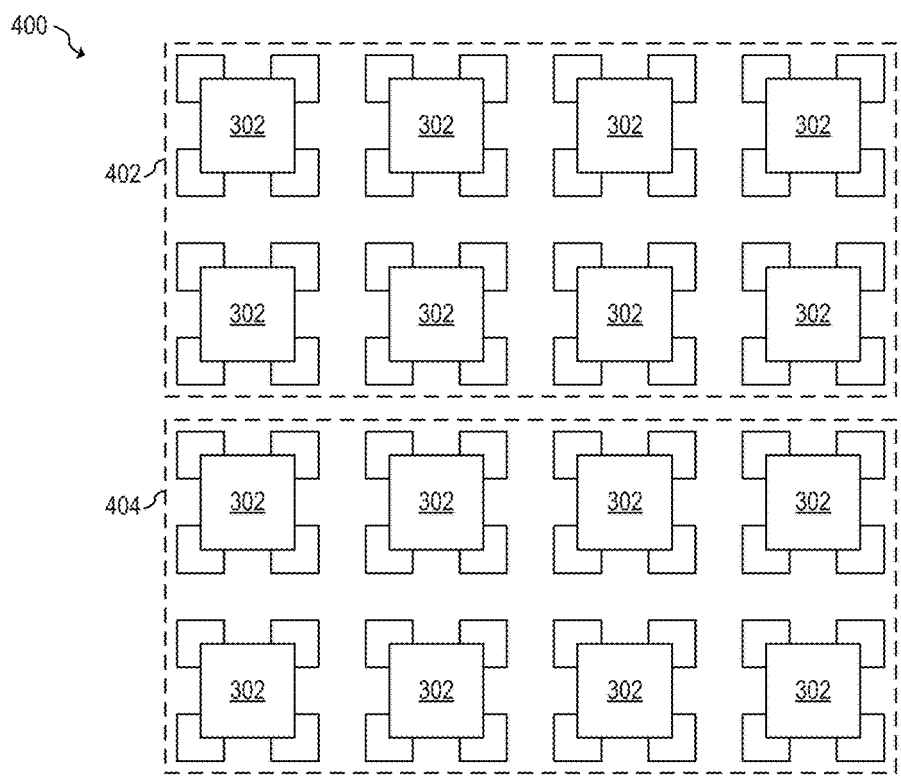
FIGS. 4 and 5 show possible ways to partition an antenna array, according to embodiments of the present invention.
Figure 5:
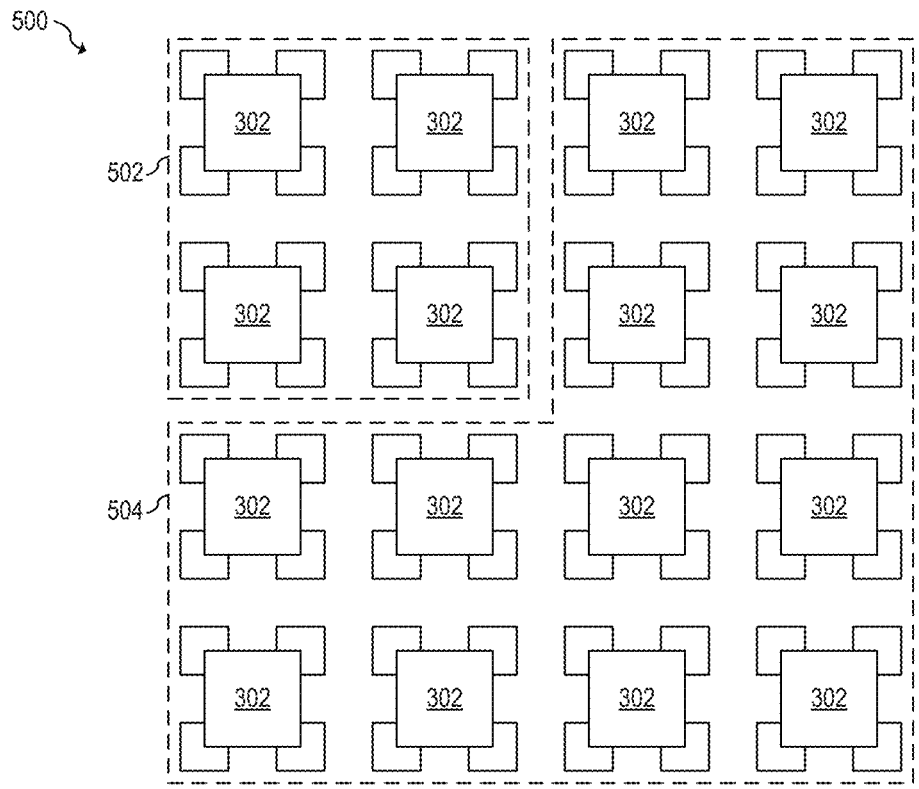

During normal operation, a first group of RFICs 302 corresponding to the first portion of antenna array 218 may be used for transmitting OFDM communication and radar signals and for receiving OFDM communication signals, and a second group of RFICs 302 corresponding to the second portion of antenna array 218 may be used for receiving radar signals. FIGS. 4 and 5 show possible ways to partition antenna array 218, according to embodiments of the present invention. Other ways to partition antenna array 218, such as other partitioning into subarrays of adjacent elements are also possible.

As shown in FIG. 4, first portion 402 of antenna array 218 and second portion 404 of antenna array 218 have the same number of antennas (in this example, each portion has 32 antennas 316). First portion 402 may be used for transmitting OFDM communication signals and radar signals and for receiving OFDM communication signals. Second portion 404 may be used for receiving radar signals.

Some embodiments may have different number of antennas for the first and second portions. For example, as shown in FIG. 5, first portion 502 has less antennas that second portion 504 (in this example, first portion 502 has 16 antennas while second portion 504 has 48 antennas). First portion 502 may be used for transmitting OFDM communication signals and radar signals and for receiving OFDM communication signals. Second portion 504 may be used for receiving radar signals. Other implementations are also possible. For example, in some embodiments, the second portion of antennas (e.g., used for receiving radar signals) may have more antennas that the first portion of antennas (e.g., used for transmitting OFDM communication signals and radar signals and for receiving OFDM communication signals). In some embodiments, antenna array 218 may be partitioned in more than two portions. For example, in some embodiments, antenna array 218 may include portions of antennas that are not being used. In some embodiments, antenna array 218 may include portions of antennas that are used for other purposes.

Each antenna element 316 of antenna array 218 is coupled to a front-end RF circuit. In some embodiments, the front-end RF circuits are implemented inside beamformer circuit(s) 210. In other embodiments, the front-end RF circuits are implemented between beamformer circuit(s) 210 and corresponding antennas 316 of antenna array 218.

Figure 6:
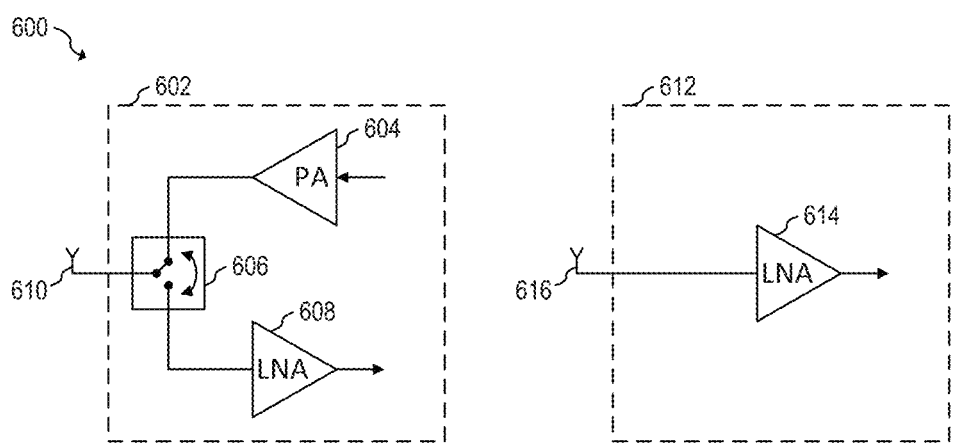
FIG. 6 shows a schematic diagram of two front-end RF circuits of a wireless multimode system, according to an embodiment of the present invention.

In some embodiments, the front-end RF circuit may be different for transmitting OFDM communication signals and radar signals and receiving OFDM communication signals (e.g., via the first portion of antenna array 218) and receiving radar signals (e.g., via the second portion of antenna array 218). For example, FIG. 6 shows a schematic diagram of front-end RF circuit 602 and front-end RF circuit 612 of wireless multimode system 600, according to an embodiment of the present invention. Wireless multimode system 600 includes an antenna array having a first portion that includes a plurality of antennas 610 and a second portion that includes a plurality of antennas 616. The first and second portions of the antenna array of wireless multimode system 600 may be implemented, e.g., in a similar manner than first portion 402 and second portion 404, or first portion 502 and second portion 504, for example. In some embodiments, wireless multimode system 600 may operate as a time-division duplexing (TDD) system.

As shown in FIG. 6, front-end RF circuit 602 includes power amplifier (PA) 604 for transmitting, via corresponding antenna 610 of antenna array 218, OFDM communication signals and radar signals. Low-noise amplifier (LNA) 608 is used to receive OFDM communication signals. When Switch 606 is in a first state, switch 606 connects power amplifier 604 with antenna 610 to allow transmission of OFDM communication signals and radar signals by power amplifier 604 via antenna 610. When switch 606 is in a second state, switch 606 connects antenna 610 with LNA 608 to allow reception of OFDM communication signals by LNA 608. Switch 606 alternates between the first and second state to allow, e.g., TDD operation. In some embodiments, a controller, such as controller 220, may control switch 606.

Front-end RF circuit 612 includes LNA 614 for receiving radar signals. As shown in FIG. 6, LNA 614 is directly connected to antenna 616 to allow for continuous reception of radar signals.

Figure 7:
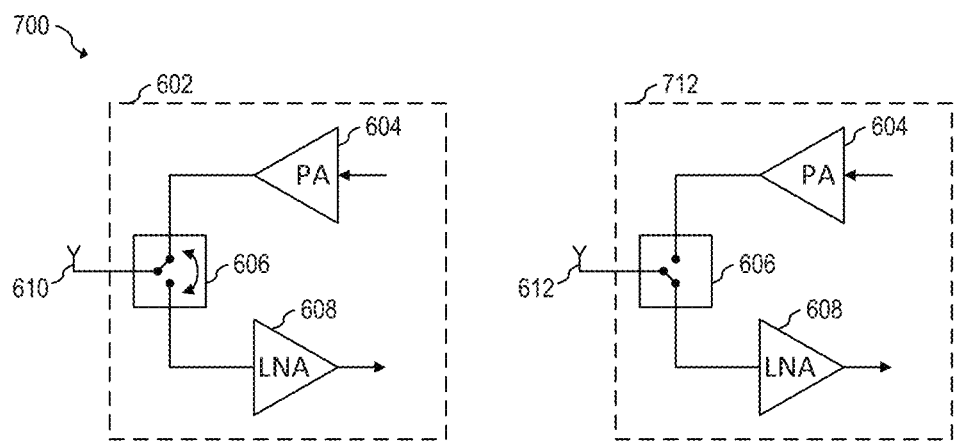
FIG. 7 shows a schematic diagram of a wireless multimode system having configurable front-end RF circuits, according to an embodiment of the present invention.

Wireless multimode system 600 may be implemented with non-configurable front-end RF circuits 602 and 612. In such embodiments, the partitioning of the antenna array (e.g., between the first portion and the second portion) is fixed by hardware. In some embodiments, wireless multimode system 600 may be implemented with a configurable front-end RF circuit. For example, FIG. 7 shows a schematic diagram of wireless multimode system 700 having configurable front-end RF circuits, according to an embodiment of the present invention. As shown in FIG. 7, the same hardware design is used for front-end RF circuits for the first and second portion of the antenna array of wireless multimode system 700. A controller, such as controller 220, may control switch 606 of front-end RF circuit 602 to alternate between first and second states in a similar manner as in wireless multimode system 600, while controlling switch 606 of front-end RF circuit 712 to be continuously in a state that connects antenna 612 to LNA 608 to allow for continuous reception of radar signals.

Having the same hardware design for both the first and second portions of the antenna array of wireless multimode system 700 advantageously allows for modifying the partitioning of the antenna array (e.g., from the arrangement shown in FIG. 3 to the arrangement shown in FIG. 4) by, e.g., a partitioning module of the controller (e.g., 220) to optimize operations.

Figure 8:
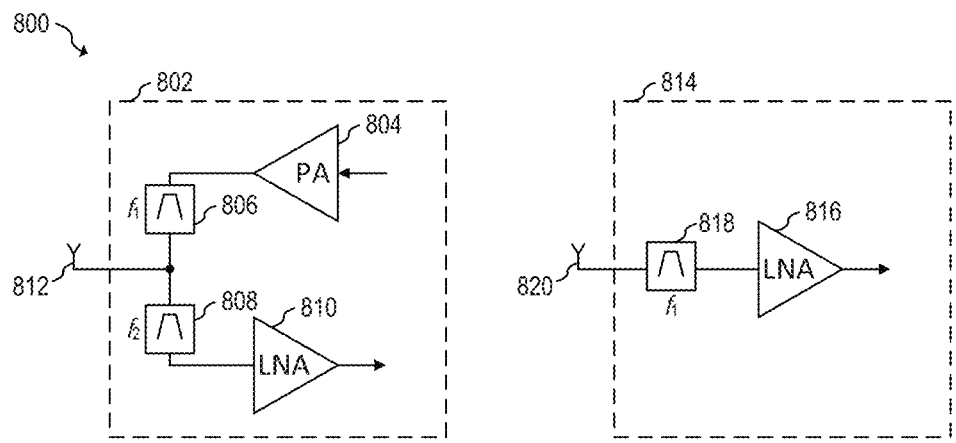
FIG. 8 shows a schematic diagram of two front-end RF circuits of a wireless multimode system, according to an embodiment of the present invention.

FIG. 8 shows a schematic diagram of front-end RF circuit 802 and front-end RF circuit 814 of wireless multimode system 800, according to an embodiment of the present invention. Wireless multimode system 800 includes an antenna array having a first portion that includes a plurality of antennas 812 and a second portion that includes a plurality of antennas 820. The first and second portions of the antenna array of wireless multimode system 800 may be implemented, e.g., in a similar manner than first portion 402 and second portion 404, or first portion 502 and second portion 504, for example. In some embodiments, wireless multimode system 600 may operate as a frequency-division duplexing (FDD) system.

As shown in FIG. 8, front-end RF circuit 802 includes power amplifier (PA) 804 for transmitting, via corresponding antenna 812 of antenna array 218, OFDM communication signals and radar signals in a first frequency range $f_1$. Low-noise amplifier (LNA) 810 is used to receive OFDM communication signals in a second frequency range $f_2$. Filters 806 and 808 are band-pass filters with a pass-band in the first frequency range $f_1$ and second frequency range $f_2$, respectively.

Front-end RF circuit 814 includes LNA 816 for receiving radar signals. As shown in FIG. 8, LNA 816 is connected to antenna 820 via filter 818 to allow for continuous reception of radar signals in the first frequency range $f_1$.

Figure 9:
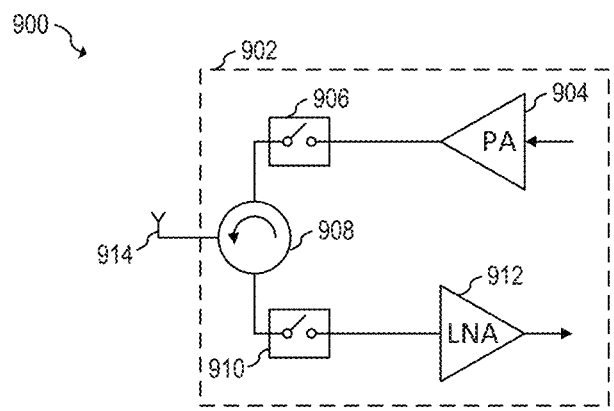
FIG. 9 shows a schematic diagram of a wireless multimode system having configurable front-end RF circuits, according to an embodiment of the present invention.

FIG. 9 shows a schematic diagram of wireless multimode system 900 having configurable front-end RF circuits 902, according to an embodiment of the present invention. Each antenna of antenna array 218 of wireless multimode system 900 is coupled to a corresponding front-end RF circuit 902. Front-end RF circuit 902 includes power amplifier 904, LNA 912, circulator 908 and switches 906 and 910.

During normal operation, circulator 908 causes RF signals coming from power amplifier 904 to flow to antenna 914 but not to LNA 912. Circulator 908 causes RF signals coming from antenna 914 to flow to LNA 912 but not to power amplifier 904. Switches 906 and 910 are optional, e.g., to provide additional isolation.

Similar to wireless multimode system 700, wireless multimode system 900 may be configured (e.g., by controller 220) to modify the allocation of antennas 316 to first and second portions of antenna array 218 (e.g., between the arrangement of FIGS. 4 and 5) for transmitting OFDM communication signals and radar signals and receiving OFDM communication signals, and for receiving radar signals, respectively.

In some embodiments, wireless multimode system 900 may configure one portion one portion of antenna array 218 for transmitting and receiving OFDM signals, and another portion of antenna array 218 for transmitting and receiving radar signals. For communication operations, switches 906 and 910 switch in TDD fashion. For radar operations, switches 906 and 910 are closed.

In some embodiments, wireless multimode system 900 may be used for simultaneous communication and radar operations. For example, during transmission of OFDM communication signals and radar signals, switch 906 is closed and switch 910 is open. For receiving radar signals, which happens shortly after transmission of the radar signals, switches 906 and 910 are closed. For receiving OFDM communication signals, which occurs after the reception of the radar signals, switch 906 is open to improve isolation of circulator 908.

Figure 10:
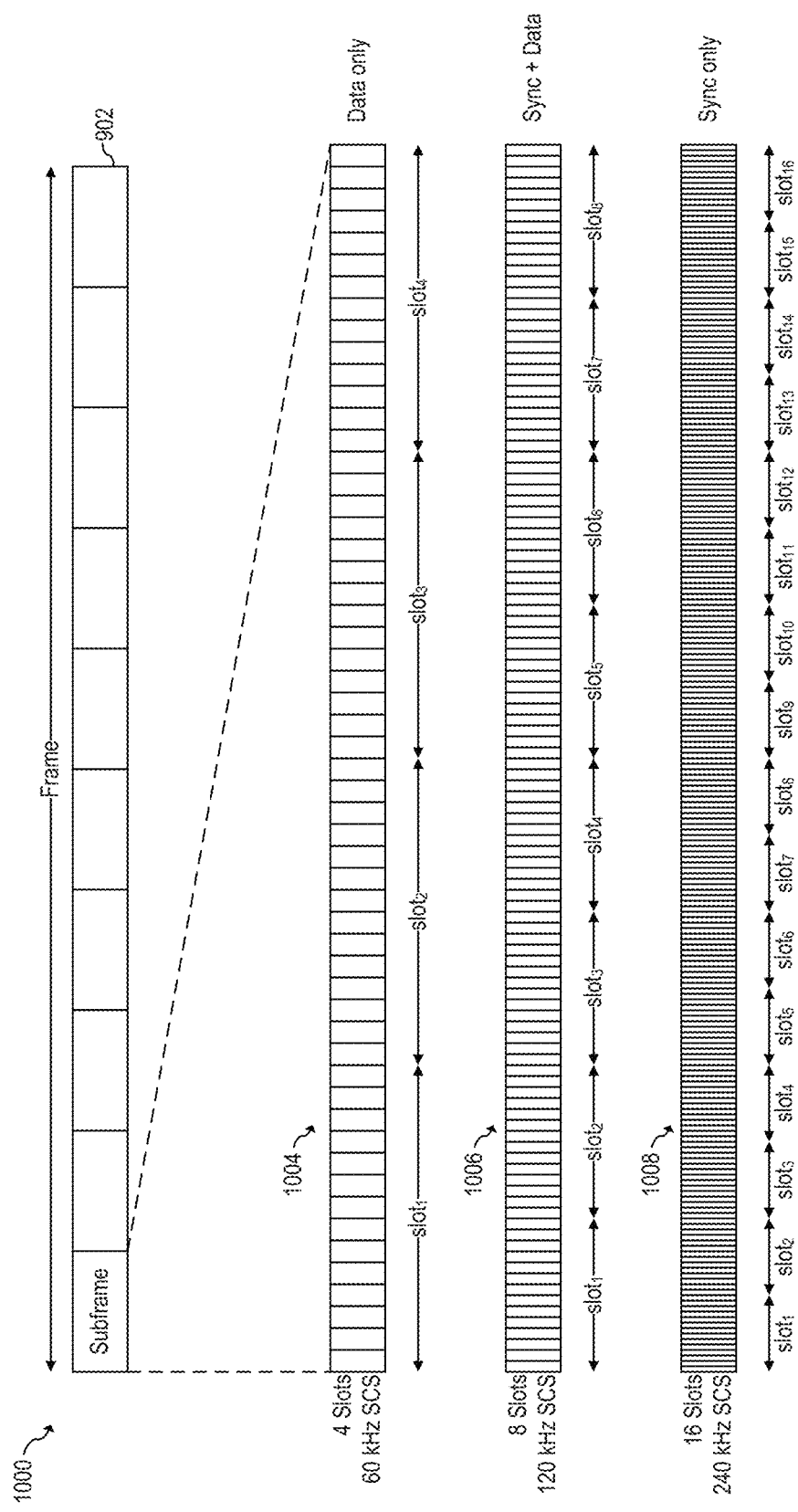
FIGS. 10-12 illustrate frames transmitted by a millimeter-wave multimode system, according to an embodiment of the present invention.
Figure 11:
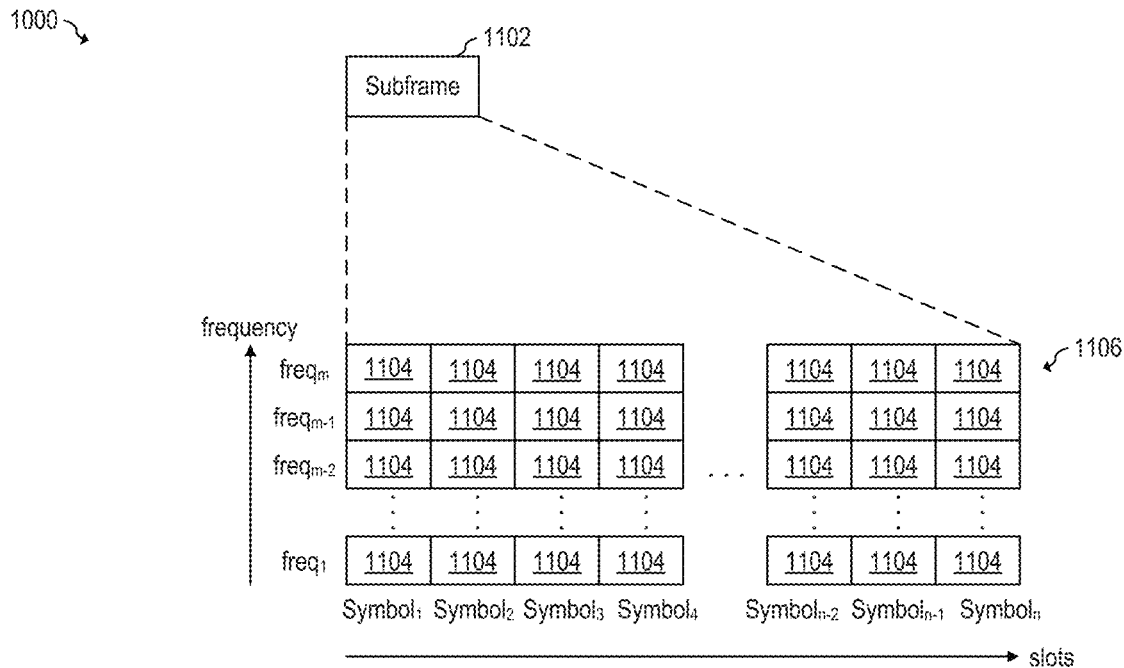
Figure 12:
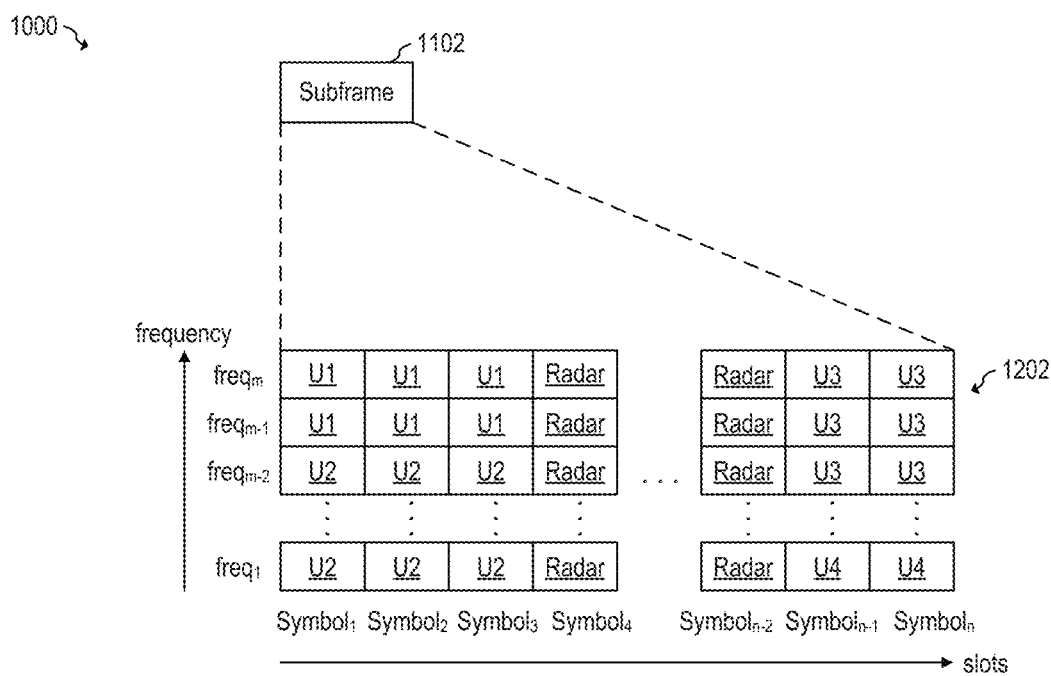

In some embodiments, the wireless multimode system transmits frames that include communication signals and radar signals. FIGS. 10-12 illustrate frames transmitted by millimeter-wave multimode system 1000, according to an embodiment of the present invention. Millimeter-wave multimode system 1000 is a wireless multimode system that operates in the millimeter-wave frequency band and that may be implemented, for example, as wireless multimode systems 100, 200, 300, 400, 500, 600, 700, 800, and 900.

FIG. 10 shows a frame structure such as for 5G NR standard. As shown in FIG. 10, radio frame 902 includes a plurality of sub-frames. Each sub-frame (e.g., 1004, 1006, or 1008) includes a plurality of slots. Each slot contains OFDM symbols that include resource blocks. Each resource block (depicted as boxes inside each sub-frame) includes an OFDM symbols, where each OFDM symbol has a cycle prefix (CP). In LTE, a resource block has 12 sub-carriers and 1 slot (14 symbols). In 5G, a resource block has 12 sub-carriers and 1 symbol. In some embodiments, radio frame 902 may be a 10 ms frame and may include 10 sub-frames of 1 ms each. Frames of different duration and including a different number of sub-frames are also possible.

The number of slots in each sub-frame depends on the chosen sub-carrier spacing (SCS). For example, sub-frame 1004 operates at 60 kHz SCS and has 4 slots. Sub-frame 1006 operates at 120 kHz SCS and has 8 SCS. Sub-frame 1008 operates at 240 kHz SCS and has 16 slots.

As shown in FIG. 11, each sub-frame, such as sub-frame 1102, includes resource grid 1106 that includes n times m resource blocks 1104, where m is the number of frequency channels (freq$_1$ to freq$_m$) and n is the number of resource blocks in each frequency channel. In some embodiments, m and n depend on the bandwidth of the signal and may be configurable. For example, in some embodiments, n may be 28 and m may be 7. In some embodiments, n may be lower than 28, such as 16 or 14 or lower, or may be higher than 28, such as 32, 56 or higher. In some embodiments, m may be lower than 7, such as 6 or 4 or lower, or higher than 7, such as 8, 12, 16, 24 or higher.

Resource blocks 1104 may be allocated to one or more 5G communication users and for radar signals. FIG. 12 shows a non-limiting example of resource grid 1202 showing possible allocation of resource blocks 1104 to 5G communication users U1, U2, U3, and U4, and for radar signals. As shown in FIG. 12, in some embodiments, the full frequency bandwidth (i.e., all sub-carriers in all frequency channels freq$_1$ to freq$_m$ in a time slot) may be allocated to radar signals. One or more consecutive time slot may be assigned to radar signals. In some embodiments, more than one non-consecutive time slot may be assigned to radar signals.

Figure 13:
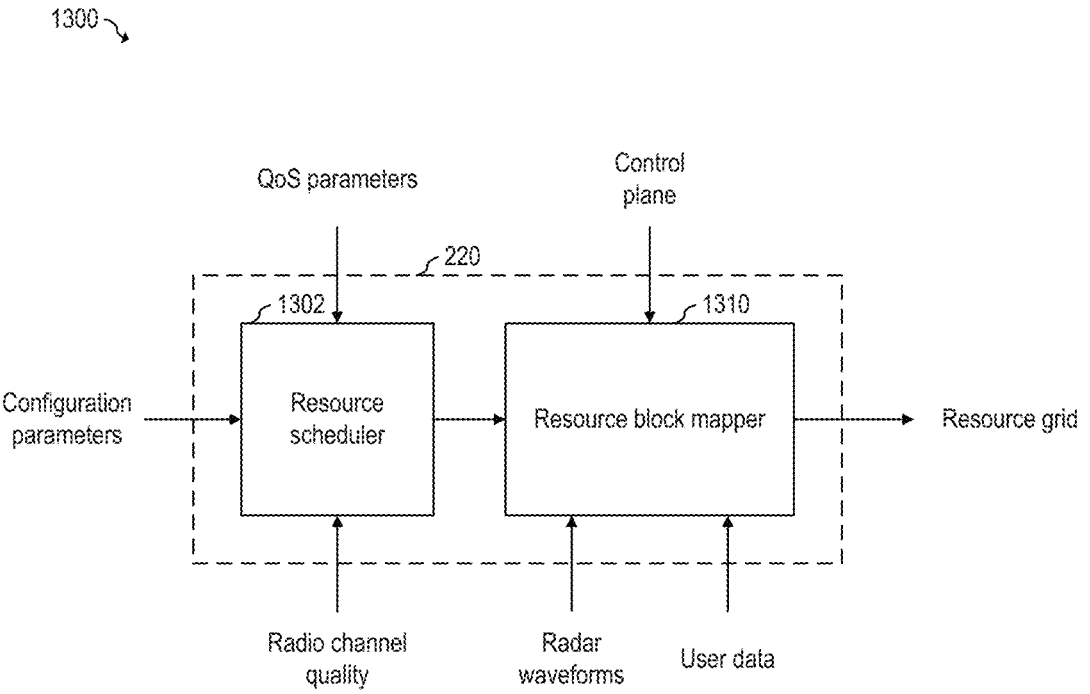
FIG. 13 shows a schematic diagram of a portion of the controller of any of the millimeter-wave systems of FIGS. 1-12, according to an embodiment of the present invention.

In some embodiments, the time/frequency allocation of resource blocks between communication users and radar signals is controlled by a resource scheduler and resource block mapper, e.g., implemented in controller 220. FIG. 13 shows a schematic diagram of a portion of controller 220, according to an embodiment of the present invention.

During normal operation, resource scheduler 1302 receives radio channel quality information, quality of service (QoS) parameters (e.g., priority of user), and configuration parameters and perform time/frequency allocations to the 5G communication signals and radar signals. Resource block mapper allocates resources (e.g., resource blocks) in a resource grid (e.g., 1106) for radar waveforms, 5G communication user data, and control plane information based on the output of the time frequency allocation from resource scheduler 1302

Resource scheduler 1302 allocates bandwidth (e.g., resource blocks) based on the received radio channel quality information, and/or quality of service (QoS) parameters, and/or configuration parameters. In some embodiments, QoS refers to throughput, latency, jitter, reliability, and/or packet error rate, and/or other parameters. For example, in some embodiments, when throughput assigned to a user is high, more resource blocks per unit time may be allocated to such user. Conversely, when throughput assigned to a user is low, less resource blocks per unit time may be allocated to such user. For example, a video call may have higher priority than a TCP/IP communication. In some embodiments, radar signals may be assigned a medium QoS priority (not the highest and not the lowest). In some embodiments, radar signals are scheduled by resource scheduler 1302 according to the assigned priority.

In some embodiments, when 5G communication traffic conditions are high, resource scheduler 1302 may allocate more resource blocks to 5G communication than when 5G communication traffic conditions are low.

Configuration parameters may include, for example, a minimum frequency (maximum period) for transmitting radar signals. In some embodiments, the maximum period may be, for example, 5 ms. Longer periods, such as 6 ms, 10 ms, or longer, or shorter periods, such as 4 ms. 3.5 ms, or shorter, may also be used.

In some embodiments, resource scheduler 1302 ensures that radar signals are transmitted at least at the minimum frequency specified by the configuration parameters. In some embodiments, the configuration parameters are static (i.e., do not change during operation). In other embodiments, the configuration parameters may be dynamically modified.

After the bandwidth of resource grid 1106 is allocated between 5G communication signals and radar signals, resource block mapper allocates 5G communication user data to resource blocks of resource grid 1106 allocated to 5G communication, radar waveforms to resource blocks of resource grid 1106 allocated to radar signals. In some embodiments, resource block mapper 1310 also allocates resource blocks to control plane information.

In some embodiments, resource scheduler 1302 and resource block mapper 1310 are implemented as a software engine in controller 220. For example, controller 220 may be configured to execute software instructions stored in a memory associated with controller 220 to perform the functions of resource scheduler 1302 and resource block mapper 1310. In other embodiments, resource scheduler 1302 and resource block mapper 1310 may be implemented using hardcoded digital hardware (e.g., with logic circuits), which in some embodiments may be configurable (e.g., via registers).

In some embodiments, the radar waveforms allocated in resource grid 1106 may also be generated by controller 220. In some embodiments, the radar waveforms may be any of PRBS, FSK/MFCW, and/or COSTAS code. Other types of radar waveforms may also be used.

In some embodiments, a millimeter-wave multimode system uses a single type of radar waveform. In other embodiments, controller 220 may dynamically select the type of radar waveforms to be used, e.g., based on computational resources available and/or performance of the particular radar waveforms.

Figure 14:
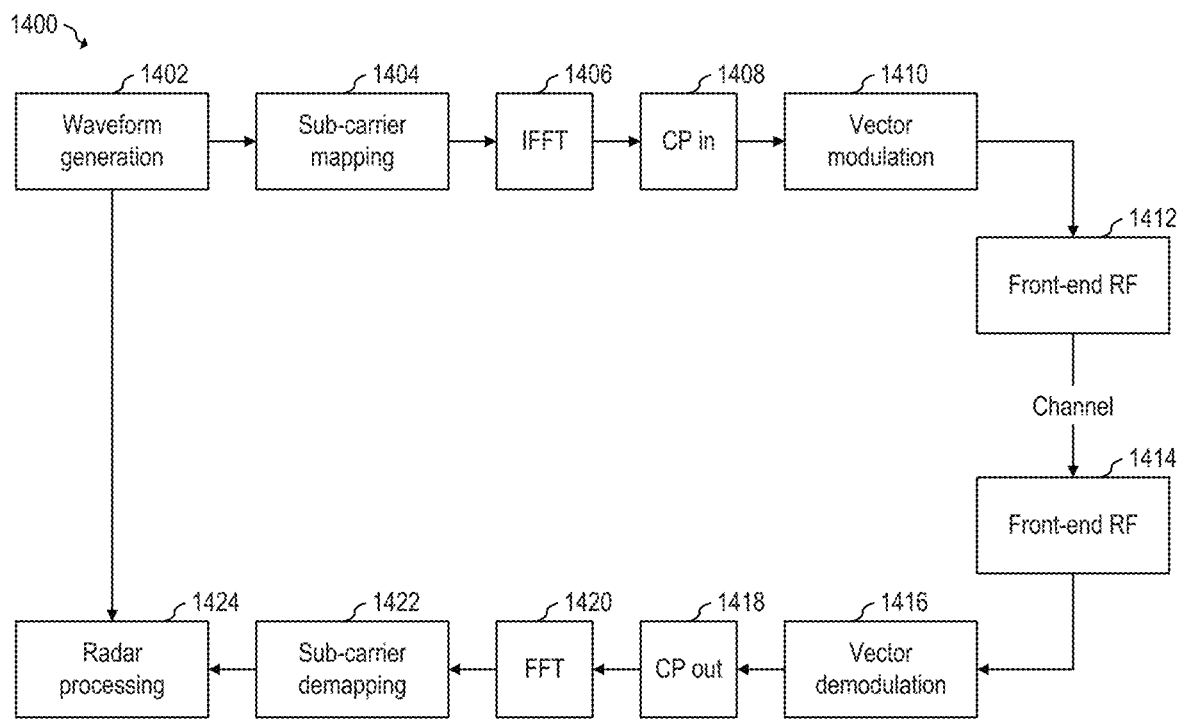
FIG. 14 shows a block diagram of an OFDM transceiver, according to an embodiment of the present invention.

FIG. 14 shows a block diagram of OFDM transceiver 1400, according to an embodiment of the present invention. OFDM transceiver 1400 may be implemented, for example, by wireless multimode systems 100, 200, 300, 400, 500, 600, 700, 800, 900, and 1000.

Waveform generator block 1402 generates the radar waveforms. Radar waveforms may be, for example, PRBS, FSK/MFCW, and/or COSTAS code. Other types of radar waveforms may also be used. In some embodiments, radar waveform generation is performed by controller 220. In other embodiments, radar waveforms are not generated inside the millimeter-wave multimode system. Instead, in such embodiments, the radar waveforms may be stored, e.g., in a memory associated with the millimeter-wave multimode system.

Radar waveform generation may be performed in ways known in the art. For example, if PRBS radar waveforms are used, autocorrelation between transmitted and received radar waveforms may be used to determine distance towards target. For example, the peak of the autocorrelation function corresponds to the lag of the received signal, which represents the round trip delay and thus the range of the target from antenna array 217. The PRBS sequence may be generated using linear feedback shift register. For a maximal length code of PRBS sequence with chirp period $T_c$ and length M, the autocorrelation $R_p(t)$ may be expressed by Equations 1 and 2 below.

$$p(t) = \sum_{n=1}^{M} a_n c(t - nT_c) \quad (1)$$

$$R_p(t) = \begin{cases} -(t+T_c) \cdot \frac{M^2+1}{MT_c} + M; 0 \le t \le T_c \\ (t+T_c) \cdot \frac{M^2+1}{MT_c} - \frac{1}{M}; -T_c \le t \le 0 \\ -\frac{1}{M}; \text{otherwise} \end{cases} \quad (2)$$

where p(t) denotes a train of periodic pulses with period $T_c$ and amplitudes $a_m = \pm 1$, and c(t) is the basic pulse with time duration $T_c$ and unitary amplitude.

As another example, if MFCW/FSK is used, when a sinusoidal wave is sent with constant frequency $\sin(2\pi f_0 t)$ by, e.g., antenna array 218, the reflected signal arrives at antenna array 218

$$T = \frac{2R}{c}$$

seconds later, where c is the speed of light and are is the distance between antenna array 218 and the object that reflected the sinusoidal wave. The received signal may be $\sin(2\pi f_0(t-T))$, and is $2\pi f_0 T$ out of phase compared to the transmitted sinusoidal wave. By measuring the phase different $\Delta\phi$, R may be determined by $$R = \frac{c\Delta\phi}{4\pi f_0} \quad (3)$$

An MFCW radar uses two or more parallel sinusoidal signals with different frequencies $f_3$ and $f_4$ are used to increase the unambiguous distance. The reflected signals $r_1$ and $r_2$ may be given by $$r_1 = \sin(2\pi(f_3 \pm f_d)t - \frac{4\pi f_3 R}{c}) \quad (4)$$

$$r_2 = \sin(2\pi(f_4 \pm f_d)t - \frac{4\pi f_4 R}{c})$$

where $f_d$ is Doppler frequency shift, and R is the range towards the target (object) in which the signal was reflected. After mixing the reflected signals with the corresponding transmitted signals, the output signals may be given by $$d_1 = \sin(\pm 2\pi f_d t - \frac{4\pi f_3 R}{c}) \quad (5)$$

$$d_2 = \sin(\pm 2\pi f_d t - \frac{4\pi f_4 R}{c})$$

where $d_1$ is first downconverted waveform and $d_2$ is second downconverted waveform. The waveforms $d_1$ and $d_2$ are two equations with two unknowns that can be solved for R and $f_d$. One way to solve equations is by determining the phase difference $\Delta\phi$ (e.g., by measuring the phase difference). The distance R may be determined by $$R = \frac{c\Delta\phi}{4\pi\Delta f} \quad (6)$$

where $\Delta f = f_4 - f_3$.

Sub-carrier mapping block 1404 maps the radar waveforms to the sub-carrier frequency. IFFT block 1406 performs an inverse FFT (IFFT) on the mapped sub-carrier frequency radar waveforms. CP in block 1408 prepends the cyclic prefix (CP) to package the radar waveforms for transmission.

Vector modulation block 1410 performs vector modulation (which modulates a carrier signal by a baseband signal) of the packaged radar waveforms. In some embodiments, vector modulation block 1410 also performs frequency conversion (which converts the frequency of the already modulated signal). Front-end RF circuit 1412 associated with the first portion of antenna array 218, such as front-end RF circuits 602, 802, or 902, are used to transmit the packaged radar waveforms via the first portion of antenna array 218 through a channel (e.g., air), e.g., using resource blocks allocated to radar signals in the resource grid 1106.

Front-end RF circuit 1414 associated with the second portion of antenna array 218, such as front-end RF circuits 612, 712, 814, or 902, receive via the second portion of antenna array 218 the reflected radar waveforms via the channel. Vector demodulation block 1416, performs vector demodulation of the packaged radar waveforms. In some embodiments, vector modulation block 1416 also performs frequency conversion. CP out block 1418 removes the CP d from the received radar waveforms. FFT block 1420 performs an FFT on the received radar waveforms.

Sub-carrier de-mapping block 1422 demaps the FFT transformed radar waveforms. Radar processing block 1424 performs radar processing on the de-mapped radar waveforms, for example, to determine the angle of arrival of the echo signal, location (i.e., range, azimuth and elevation components) of moving and/or static objects in the field-of-view (FoV) of the beam, velocity and/or direction of movement of objects in the FoV of the beam, identification of the type of objects detected (e.g., using micro-Doppler and/or macro-Doppler signatures), etc. In some embodiments, blocks 1402, 1404, 1406, 1408, 1418, 1420, 1422, and 1424 are performed by modem 202.

Figure 15:
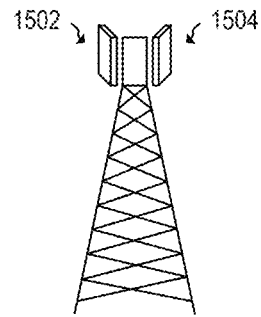
FIG. 15 shows a base station having a millimeter-wave multimode system, according to an embodiment of the present invention.

In some embodiments, the wireless multimode system (e.g., 100, 200, 300, 400, 500, 600, 700, 800, 900, and 1000) may be implemented in a logical base station. For example, FIG. 15 shows base station 1502 having wireless multimode system 1504, according to an embodiment of the present invention. Base station 1502 may be, for example, an eNB base station (also known as evolved node B, or eNodeB), or a gNB base station. Other logical base stations may also implement wireless multimode systems, such as 100, 200, 300, 400, 500, 600, 700, 800, 900, and 1000.

Advantages of some embodiments include adding radar functionality to base stations such as eNB or gNB by reusing the base station hardware. Reusing the base station's hardware to implement radar functionality advantageously allows for performing radar functions without increasing the form factor and keeping costs low.

Figure 16:
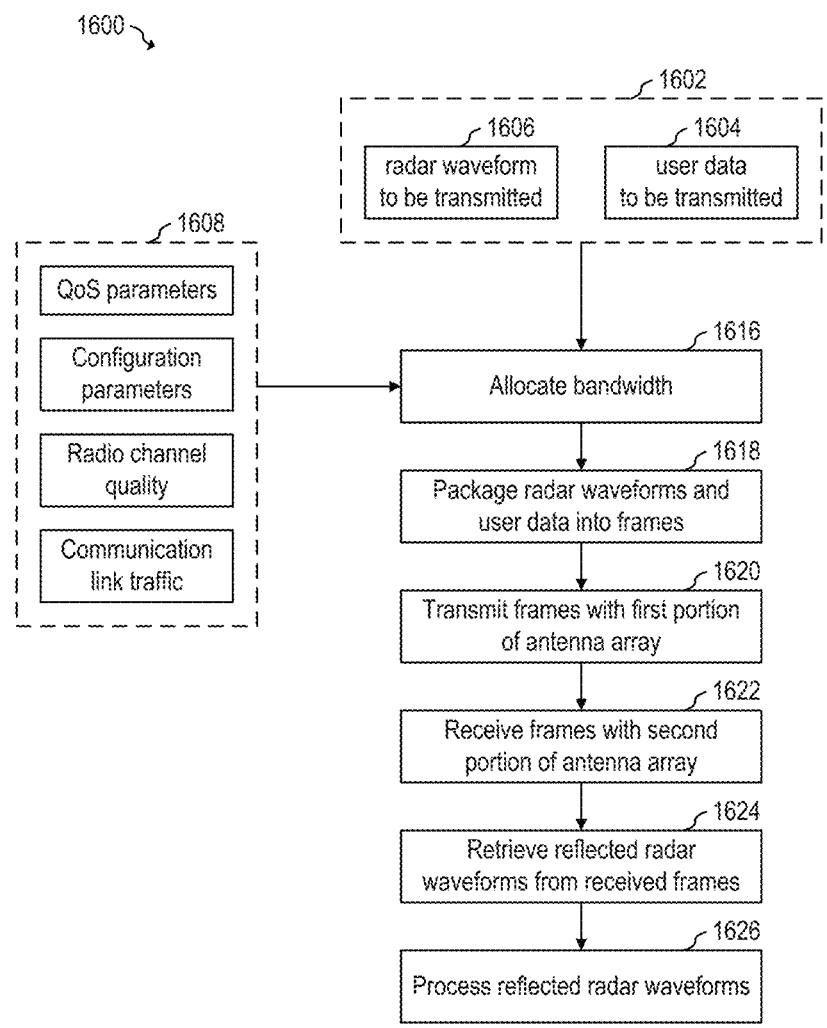
FIG. 16 shows a flow chart of an embodiment method for operating a wireless multimode system in a base station, according to an embodiment of the present invention.

Incorporating radar functionality to base stations advantageously allows for monitoring people presence near the base station and turn on/off portions of the base station based on the presence detection. By turning off portions of the base stations based on the presence of people near the base station, power consumption may be reduced without affecting the 5G communication performance. FIG. 16 shows a flow chart of embodiment method 1600 for operating a wireless multimode system in a base station, according to an embodiment of the present invention. Method 1600 may be implemented, for example, by any of wireless multimode systems 100, 200, 300, 400, 500, 600, 700, 800, 900, and 1000, which may be located, for example in base station 1502.

During step 1602, a wireless multimode system receives data to be transmitted. The wireless multimode system includes an array of N antenna elements, such as antenna array 218. The antenna array includes a first portion having M antenna elements, such as first portions 402 or 502, and a second portion having L antenna elements, such as second portions 404 or 504, for example. In some embodiments M is equal to L. In other embodiments, M is different than L (e.g., M may be higher or lower than L).

In some embodiments, the wireless multimode system also includes M transmission amplifiers, such as 604, 804, and 904, coupled to respective antenna elements of the first portion of M antenna elements. The M transmission amplifiers are configured to transmit via the M antenna elements, frames of transmit data, such as frame 902.

In some embodiments, each frame includes P sub-frames, such as 10, as shown in FIG. 10. Each sub-frame (e.g., 1004, 1006, 1008, 1102) may include Q time slots (e.g., Symbol, to Symbol). Each time slot may include R frequency bands (e.g., $freq_1$ to $freq_m$).

In some embodiments, the wireless multimode system also includes M reception amplifiers, such as 608, 810, and 912, coupled to respective antenna elements of the first portion of M antenna elements. The M reception amplifiers are configured to receive, via the M antenna elements, frames of receive data, where a communication link is formed by transmitting and receiving frames of communication signals.

In some embodiments, the wireless multimode system also includes L reception amplifiers coupled to respective antenna elements of the second portion of L antenna elements, such as 614, 608, 816, and 912. The L reception amplifiers are configured to receive via the L antenna elements receive radar signals (e.g., the reflected radar signals) corresponding to the transmit radar signals.

Step 1602 includes steps 1606 and step 1604. During step 1606, radar waveforms are received, e.g., by controller 220 (e.g., resource block mapper 1310) and/or modem(s) 202. Radar waveforms may be of the PRBS, FSK/MFCW, and/or COSTAS type. The radar waveforms may be generated (e.g., 1402) by controller 220 or by another portion of wireless multimode system. In some embodiments, the radar waveforms are generated externally to the wireless multimode system. In such embodiments, the radar waveforms may be received by the wireless multimode system during normal operation, and/or may be stored in a memory associated with the wireless multimode system.

During step 1604, user data to be transmitted via the communication link is received, e.g., by controller 220 (e.g., resource block mapper 1310) and/or modem(s) 202. During step 1608, parameters related to the communication link, such as QoS parameters, radio channel quality information (e.g., signal-to-noise ratio), and communication link traffic (e.g., how much bandwidth of the communication link is being requested/used by communication users) are received, e.g., by controller 220 (e.g., resource scheduler 1302). It is understood that steps 1602 and 1608 may be simultaneously or sequentially performed.

Parameters not related to the communication link may also be received during step 1608. For example, in some embodiments, configuration parameters are also received. Configuration parameters may include, for example, a minimum frequency at which radar signals are to be transmitted. In some embodiments, configuration parameters are static (i.e., do not change during normal operation of the wireless multimode system). In other embodiments, configuration parameters dynamically change during normal operation of the wireless multimode system.

During step 1616, bandwidth of the transmission portion of communication link (e.g., number and/or location of resource blocks 1104 of resource grid 1106) may be allocated, e.g., by resource scheduler 1302 to communication signals and radar signals, based on one or more parameters determined/received during step 1608. In some embodiments, when allocating bandwidth to radar signals in a time slot, all frequency bands of the time slot are allocated to the radar signals. In some embodiments, more than one consecutive time slots are allocated to radar signals, where all frequency bands in all allocated time slots are allocated to radar signals.

During step 1618, the radar waveforms and the communication data are packaged in frames (e.g., 902) in accordance with the bandwidth allocation determined during step 1616 (e.g., resource grid 1202). The packaging of radar waveforms may include, for example, steps 1404, 1406, 1408, and 1410.

During step 1620, the frames that include communication signals (user data) and radar signals (radar waveforms) are transmitted via the first portion of the antenna array using the M transmission amplifiers. Step 1620 may include, e.g., step 1412.

During step 1622, reflected frames that include reflected radar signals corresponding to the transmitted radar signals are received by the L reception amplifiers via the second portion of the antenna array. Step 1622 include, e.g., step 1414.

During step 1624, the reflected radar waveforms are retrieved (e.g., unpacked) from the received reflected frames. Step 1624 may include, for example, steps 1416, 1418, 1420, and 1422.

During step 1626, the received reflected radar waveforms are processed to, e.g., determine information of a target. Step 1626 may include, for example, step 1424. During step 1626, a location of a target in a field of view of the wireless multimode system may be determined. Other parameters, such as whether the target is moving or static, the velocity of movement, the size of the target, the material of the target, and other parameters may also be identified.

Figure 17:
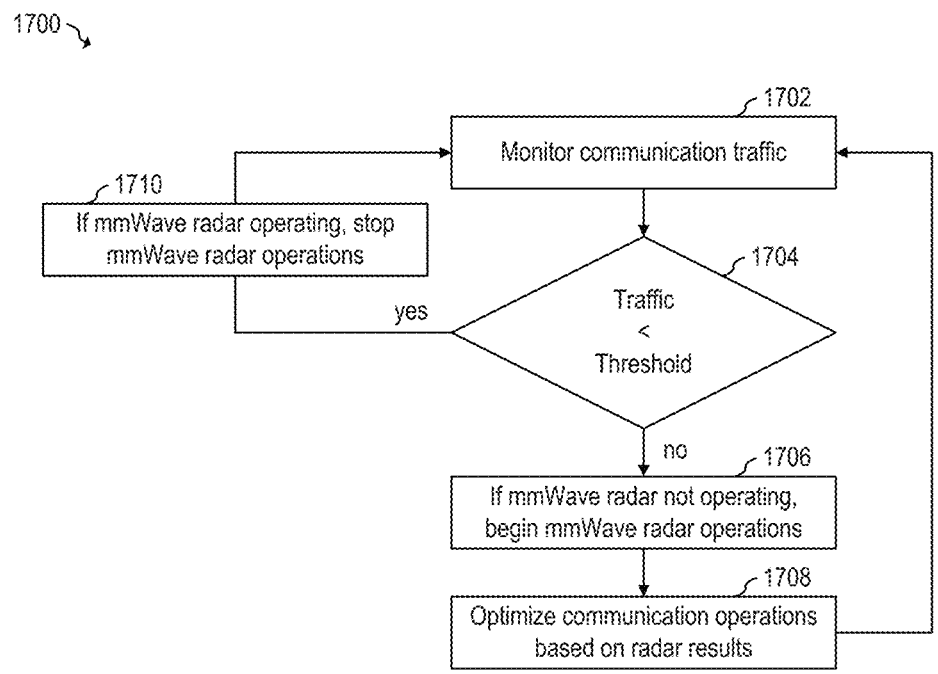
FIG. 17 shows a flow chart of an embodiment method for operating a wireless multimode in a base station, according to an embodiment of the present invention.

Determining the location of a target by the radar function of the base station advantageously allows for optimizing communication operations based on radar operations results. For example, in some embodiments, the wireless multimode system may optimize beamsteering of the antenna array to avoid shadowing and reduce network entry time by lowering the amount of initial beams. FIG. 17 shows a flow chart of embodiment method 1700 for operating a wireless multimode system in a base station, according to an embodiment of the present invention. Method 1700 may be implemented, for example, by any of wireless multimode systems 100, 200, 300, 400, 500, 600, 700, 800, 900, and 1000, which may be located, for example in base station 1502.

During step 1702, the wireless multimode system monitors communication traffic, which may include, e.g., bandwidth usage for the communication operations (e.g., performed via the first portion of the antenna array). During step 1704, the wireless multimode system compares the traffic level (e.g., the communication bandwidth usage) with a predetermined threshold. If the bandwidth usage is below a threshold (e.g., 50% of available bandwidth), the wireless multimode system may turn off portions of the wireless multimode system. For example, during step 1710, the second portion may be turned off, e.g., to lower power consumption. In some embodiments, the resource scheduler may stop allocating bandwidth to radar waveforms when the second portion of the antenna array is off.

If during step 1704 it is determined that communication traffic is above or equal to the threshold, the wireless multimode system begins or continues performing radar operations during step 1706. For example, if the second portion of the antenna array is off, the second portion is turned on during step 1706. Similarly, if radar waveforms are not being transmitted via the first portion of the antenna array, radar waveforms begin to be transmitted via the first portion of the antenna array during step 1706.

During step 1708, the communication operations (e.g., the transmission of communication data via the first portion of the antenna array) are optimized based on radar results (e.g., based on results obtained during step 1626). For example, if it is determined (e.g., by controller 220) by performing radar operations on reflected signals received via the second portion of the antenna array that a truck is obstructing a beam of the first portion of the antenna array, the beam may be redirected to avoid such obstruction.

In some embodiments, a millimeter-wave base station (e.g., small cell) may be complementary to a macro base station. For example, when traffic is low in the millimeter-wave base station, the millimeter-wave base station may disable the communication function while keeping radar functionality enabled. If objects are detected by the radar functionality of the millimeter-wave base station, the communication function of the millimeter-wave base station may be enabled. By disabling the communication function when possible, power consumption may be advantageously reduced.

Example embodiments of the present invention are summarized here. Other embodiments can also be understood from the entirety of the specification and the claims filed herein.

Example 1. A wireless multimode system including: an array of N antenna elements, the array including a first portion of M antenna elements and a second portion of L antenna elements, the second portion being different than the first portion, where N, M and L are positive integers greater than zero, and where M plus L is lower than or equal to N; M transmission amplifiers coupled to respective antenna elements of the first portion of M antenna elements, the M transmission amplifiers configured to transmit, via the M antenna elements, frames of transmit data, where the frames of transmit data includes transmit radar signals and transmit communication signals; M reception amplifiers coupled to respective antenna elements of the first portion of M antenna elements, the M reception amplifiers configured to receive, via the M antenna elements, frames of receive data, where the frames of receive data includes receive communication signals, where the transmit communication signals and the receive communication signals form a communication link; and L reception amplifiers coupled to respective antenna elements of the second portion of L antenna elements, the L reception amplifiers configured to receive, via the L antenna elements, receive radar signals, where the receive radar signals corresponds to the transmit radar signals; and a resource scheduler configured to allocate bandwidth for transmit radar signals and transmit communication signals within the frames of transmit data based on one or more predetermined parameters.

Example 2. The wireless multimode system of example 1, where each frame includes P sub-frames, each sub-frame including Q time slots, each time slot including R frequency bands, where the resource scheduler is configured to, when allocating a first time slot to radar signals, allocating the R frequency bands of the first time slot to the radar signals, where P, Q and R and positive integers greater than zero.

Example 3. The wireless multimode system of one of examples 1 or 2, where each frame of transmit data includes P sub-frames, each sub-frame including Q time slots, each time slot including R frequency bands, where the resource scheduler is configured to, when allocating a time slots to transmit radar signals, allocating more than one consecutive time slots to the radar signals, where P, Q and R and positive integers greater than zero.

Example 4. The wireless multimode system of one of examples 1 to 3, where R frequency bands correspond to 12 orthogonal frequency division multiplexing (OFDM) sub-carriers.

Example 5. The wireless multimode system of one of examples 1 to 4, where the one or more predetermined parameters includes an amount of traffic in the communication link, a priority queue associated with the communication link or a signal-to-noise ratio of the communication link.

Example 6. The wireless multimode system of one of examples 1 to 5, where the one or more predetermined parameters includes quality of service (QoS) parameters or radio channel quality.

Example 7. The wireless multimode system of one of examples 1 to 6, where the one or more predetermined parameters includes a maximum period for transmitting transmit radar signals.

Example 8. The wireless multimode system of one of examples 1 to 7, where the maximum period for transmitting transmit radar signals is about 5 ms.

Example 9. The wireless multimode system of one of examples 1 to 8, where the M antenna elements of the first portion are configured to transmit and receive signals in a first frequency band and the L antenna elements of the second portion are configured to receive signals in a second frequency band different than the first frequency band.

Example 10. The wireless multimode system of one of examples 1 to 9, where the transmit radar signals includes PRBS, FSK or COSTAS waveforms.

Example 11. The wireless multimode system of one of examples 1 to 10, further includes a controller configured to select a type of waveform from a radar waveform set to be used as radar signals when allocating a first time slot to radar signals, where the radar waveform set includes FSK radar signals, and where the controller includes the resource scheduler.

Example 12. The wireless multimode system of one of examples 1 to 11, where the radar waveform set further includes PRBS radar signals and COSTAS radar signals.

Example 13. The wireless multimode system of one of examples 1 to 12, where M is equal to L.

Example 14. The wireless multimode system of one of examples 1 to 13, where M plus L is equal to N.

Example 15. A millimeter-wave system including: an array of N antenna elements, where N is a positive integer greater than zero; N transmission amplifiers; N reception amplifiers; N circulator circuits coupled between respective antenna elements of the array of N antenna elements, respective transmission amplifiers of the N transmission amplifiers, and respective reception amplifiers of the N reception amplifiers, where each of the N circulator circuit is configured to, sequentially, allow signals to flow from the respective transmission amplifier to the respective antenna element while preventing signals from flowing from the respective transmission amplifier to the respective reception amplifier, and allow signals from flowing from the respective antenna element to the respective reception amplifier while preventing signals from flowing from the respective antenna element to the respective transmission amplifier; and a controller configured to partition the array into a first portion of M antenna elements and a second portion of L antenna elements, the second portion being different than the first portion, where M and L are positive integers greater than zero, and where M plus L is lower than or equal to N, where: M transmission amplifiers of the first portion are configured to transmit, via M respective antenna elements, frames of transmit data, where the frames of transmit data includes transmit radar signals and transmit communication signals, M reception amplifiers of the first portion are configured to configured to receive, via the M respective antenna elements, frames of receive data, where the frames of receive data includes receive communication signals, where the transmit communication signals and the receive communication signals form a communication link, and L reception amplifiers of the second portion configured to receive, via the L respective antenna elements, receive radar signals, where the receive radar signals corresponds to the transmit radar signals, where the resource scheduler is configured to allocate bandwidth for transmit radar signals and transmit communication signals within the frames of transmit data based on a state of the communication link.

Example 16. The millimeter-wave system of example 15, further including: N first switches coupled between respective transmission amplifiers of the N transmission amplifiers and respective circulator circuits of the N circulator circuits; and N second switches coupled between respective reception amplifiers of the N reception amplifiers and respective circulator circuits of the N circulator circuits.

Example 17. A method for operating a wireless multimode system, the method including: receiving data to be transmitted, the data including user communication data and radar waveforms; receiving information of a communication link associated with a first portion of an antenna array of the wireless multimode system; allocating bandwidth of frames to be transmitted by the first portion of the antenna array between the user communication data and the radar waveforms based on the received information of the communication link; transmitting the frames via the first portion of the antenna array; receiving reflected frames via a second portion of the antenna array, the second portion being different than the first portion, the reflected frames corresponding to the transmitted frames; retrieving reflected radar waveforms from the received reflected frames; and determining a location of a target based on the retrieved reflected radar waveforms.

Example 18. The method of example 17, further including: monitoring communication traffic of the communication link; and when communication traffic level is below a threshold, turning off the second portion of the second portion of the antenna array.

Example 19. The method of one of examples 17 or 18, further including: monitoring communication traffic of the communication link; and when communication traffic level is below a threshold, stop allocating bandwidth of the frames to be transmitted to radar waveforms while continue allocating bandwidth of the frames to be transmitted to user communication data.

Example 20. The method of one of examples 17 to 19, further including performing beamsteering on the first portion of the antenna array based on the determined location of the target.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A wireless multimode system comprising:
an array of N antenna elements, the array comprising a first portion of M antenna elements and a second portion of L antenna elements, the second portion being different than the first portion, wherein N, M and L are positive integers greater than zero, and wherein M plus L is lower than or equal to N;
M transmission amplifiers coupled to respective antenna elements of the first portion of M antenna elements, each of the M transmission amplifiers configured to transmit, via the M antenna elements, frames of transmit data, wherein the frames of transmit data comprises transmit radar signals and transmit communication signals;

M reception amplifiers coupled to respective antenna elements of the first portion of M antenna elements, the M reception amplifiers configured to receive, via the M antenna elements, frames of receive data, wherein the frames of receive data comprises receive communication signals, wherein the transmit communication signals and the receive communication signals form a communication link; and L reception amplifiers coupled to respective antenna elements of the second portion of L antenna elements, the L reception amplifiers configured to receive, via the L antenna elements, receive radar signals, wherein the receive radar signals corresponds to the transmit radar signals; and a resource scheduler configured to allocate bandwidth for transmit radar signals and transmit communication signals within the frames of transmit data based on one or more predetermined parameters.

2. The wireless multimode system of claim 1, wherein each frame of transmit data comprises P sub-frames, each sub-frame comprising Q time slots, each time slot comprising R frequency bands, wherein the resource scheduler is configured to, when allocating a first time slot to radar signals, allocating the R frequency bands of the first time slot to the radar signals, wherein P, Q and R and positive integers greater than zero.

3. The wireless multimode system of claim 2, wherein R frequency bands correspond to 12 orthogonal frequency division multiplexing (OFDM) sub-carriers.

4. The wireless multimode system of claim 1, wherein each frame of transmit data comprises P sub-frames, each sub-frame comprising Q time slots, each time slot comprising R frequency bands, wherein the resource scheduler is configured to, when allocating a time slots to the transmit radar signals, allocating more than one consecutive time slot to the transmit radar signals, wherein P, Q and R and positive integers greater than zero.

5. The wireless multimode system of claim 1, wherein the one or more predetermined parameters comprises an amount of traffic in the communication link, a priority queue associated with the communication link or a signal-to-noise ratio of the communication link.

6. The wireless multimode system of claim 1, wherein the one or more predetermined parameters comprises quality of service (QoS) parameters or radio channel quality.

7. The wireless multimode system of claim 1, wherein the one or more predetermined parameters comprises a maximum period for transmitting the transmit radar signals.

8. The wireless multimode system of claim 7, wherein the maximum period for transmitting the transmit radar signals is about 5 ms.

9. The wireless multimode system of claim 1, wherein the M antenna elements of the first portion are configured to transmit and receive signals in a first frequency band and the L antenna elements of the second portion are configured to receive signals in a second frequency band different than the first frequency band.

10. The wireless multimode system of claim 1, wherein the transmit radar signals comprises PRBS, FSK or COSTAS waveforms.

11. The wireless multimode system of claim 1, further comprises a controller configured to select a type of waveform from a radar waveform set to be used as radar signals when allocating a first time slot to radar signals, wherein the radar waveform set comprises FSK radar signals, and wherein the controller comprises the resource scheduler.

12. The wireless multimode system of claim 11, wherein the radar waveform set further comprises PRBS radar signals and COSTAS radar signals.

13. The wireless multimode system of claim 1, wherein M is equal to L.

14. The wireless multimode system of claim 1, wherein M plus L is equal to N.

15. A millimeter-wave system comprising:
an array of N antenna elements, wherein N is a positive integer greater than zero;
N transmission amplifiers;
N reception amplifiers;
N circulator circuits coupled between respective antenna elements of the array of N antenna elements, respective transmission amplifiers of the N transmission amplifiers, and respective reception amplifiers of the N reception amplifiers, wherein each of the N circulator circuit is configured to, sequentially,
allow signals to flow from the respective transmission amplifier to the respective antenna element while preventing signals from flowing from the respective transmission amplifier to the respective reception amplifier, and
allow signals from flowing from the respective antenna element to the respective reception amplifier while preventing signals from flowing from the respective antenna element to the respective transmission amplifier; and
a controller configured to partition the array into a first portion of M antenna elements and a second portion of L antenna elements, the second portion being different than the first portion, wherein M and L are positive integers greater than zero, and wherein M plus L is lower than or equal to N, wherein:
M transmission amplifiers of the first portion are each configured to transmit, via M respective antenna elements, frames of transmit data, wherein the frames of transmit data comprises transmit radar signals and transmit communication signals,
M reception amplifiers of the first portion are configured to configured to receive, via the M respective antenna elements, frames of receive data, wherein the frames of receive data comprises receive communication signals, wherein the transmit communication signals and the receive communication signals form a communication link, and
L reception amplifiers of the second portion configured to receive, via the L respective antenna elements, receive radar signals, wherein the receive radar signals corresponds to the transmit radar signals, wherein a resource scheduler is configured to allocate bandwidth for transmit radar signals and transmit communication signals within the frames of transmit data based on a state of the communication link.

16. The millimeter-wave system of claim 15, further comprising:
N first switches coupled between respective transmission amplifiers of the N transmission amplifiers and respective circulator circuits of the N circulator circuits; and
N second switches coupled between respective reception amplifiers of the N reception amplifiers and respective circulator circuits of the N circulator circuits.

17. A method of operating 1 a wireless multimode system comprising: an array of N antenna elements, the array comprising a first portion of M antenna elements and a second portion of L antenna elements, the second portion being different than the first portion, wherein N, M and L are positive integers greater than zero, and wherein M plus L is lower than or equal to N; M transmission amplifiers coupled to respective antenna elements of the first portion of M antenna elements, each of the M transmission amplifiers configured to transmit, via the M antenna elements, frames of transmit data, wherein the frames of transmit data comprises transmit radar signals and transmit communication signals; M reception amplifiers coupled to respective antenna elements of the first portion of M antenna elements, the M reception amplifiers configured to receive, via the M antenna elements, frames of receive data, wherein the frames of receive data comprises receive communication signals, wherein the transmit communication signals and the receive communication signals form a communication link; and L reception amplifiers coupled to respective antenna elements of the second portion of L antenna elements, the L reception amplifiers configured to receive, via the L antenna elements, receive radar signals, wherein the receive radar signals corresponds to the transmit radar signals; and a resource scheduler configured to allocate bandwidth for transmit radar signals and transmit communication signals within the frames of transmit data based on one or more predetermined parameters, the method comprising;
- transmitting, by the M transmission amplifiers, the frames of transmit data via the M antenna elements;
- receiving, by the M reception amplifiers, the frames of receive data via the M antenna elements; and
- receiving, by L reception amplifiers, the receive radar signals.

18. The method of claim 17, further comprising allocating the bandwidth for the transmit radar signals and the transmit communication signals within the frames of the transmit data based on the one or more predetermined parameters.

19. The method of claim 18, wherein the one or more predetermined parameters comprises an amount of traffic in the communication link, a priority queue associated with the communication link or a signal-to-noise ratio of the communication link.

20. The method of claim 17, wherein:
- transmitting by the M transmission amplifiers comprises transmitting signals in a first frequency band; and
- receiving by the L reception amplifiers comprises receiving signals in a second frequency band different from the first frequency band.

* * * * *